(12) United States Patent
Hohjoh et al.

(10) Patent No.: US 10,471,355 B2
(45) Date of Patent: Nov. 12, 2019

(54) DISPLAY SYSTEM, METHOD OF CONTROLLING DISPLAY SYSTEM, IMAGE GENERATION CONTROL PROGRAM, AND COMPUTER-READABLE STORAGE MEDIUM

(71) Applicant: SHARP KABUSHIKI KAISHA, Sakai, Osaka (JP)

(72) Inventors: Naohiro Hohjoh, Sakai (JP); Makoto Shiomi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/769,216

(22) PCT Filed: Jul. 19, 2016

(86) PCT No.: PCT/JP2016/071178
§ 371 (c)(1),
(2) Date: Apr. 18, 2018

(87) PCT Pub. No.: WO2017/068824
PCT Pub. Date: Apr. 27, 2017

(65) Prior Publication Data
US 2018/0304153 A1 Oct. 25, 2018

(30) Foreign Application Priority Data
Oct. 21, 2015 (JP) .................. 2015-207307

(51) Int. Cl.
*A63F 13/525* (2014.01)
*G06T 19/00* (2011.01)
(Continued)

(52) U.S. Cl.
CPC .......... *A63F 13/525* (2014.09); *A63F 13/211* (2014.09); *A63F 13/212* (2014.09);
(Continued)

(58) Field of Classification Search
CPC .... A63F 13/525; A63F 13/211; A63F 13/212; A63F 13/213; A63F 13/25;
(Continued)

(56) References Cited

U.S. PATENT DOCUMENTS

| 7,289,130 B1 | 10/2007 | Satoh et al. |
| 9,155,967 B2 * | 10/2015 | Koganezawa ........ G06T 19/006 |

(Continued)

FOREIGN PATENT DOCUMENTS

| JP | 2001-195601 A | 7/2001 |
| JP | 2015-116336 A | 6/2015 |
| JP | 2015-170232 A | 9/2015 |

*Primary Examiner* — Chong Wu
(74) *Attorney, Agent, or Firm* — ScienBiziP, P.C.

(57) ABSTRACT

A more effective image is presented to a third person in accordance with the progress of a prescribed story of a game in which a virtual object is generated. An MR game device (3) includes a spectator-viewing-intended image synthesis unit (353) that generates a spectator viewpoint image of a virtual space containing an image of the virtual object and an image of a competitor as viewed from a virtual space viewpoint of a spectator in accordance with the progress of the prescribed story.

10 Claims, 11 Drawing Sheets

(51) Int. Cl.
    *A63F 13/213*     (2014.01)
    *A63F 13/86*     (2014.01)
    *A63F 13/55*     (2014.01)
    *A63F 13/25*     (2014.01)
    *A63F 13/211*     (2014.01)
    *A63F 13/5255*     (2014.01)
    *A63F 13/212*     (2014.01)

(52) U.S. Cl.
    CPC ............ *A63F 13/213* (2014.09); *A63F 13/25* (2014.09); *A63F 13/5255* (2014.09); *A63F 13/55* (2014.09); *A63F 13/86* (2014.09); *G06T 19/00* (2013.01); *G06T 19/006* (2013.01); *A63F 2300/5553* (2013.01); *A63F 2300/8082* (2013.01)

(58) Field of Classification Search
    CPC ...... A63F 13/5255; A63F 13/55; A63F 13/86; A63F 2300/8082; A63F 2300/5553; G06T 19/00; G06T 19/006
    See application file for complete search history.

(56) References Cited

U.S. PATENT DOCUMENTS

| | | | | |
|---|---|---|---|---|
| 2014/0125698 A1* | 5/2014 | Latta | ........................ | G06F 3/011 |
| | | | | 345/633 |
| 2018/0256977 A1* | 9/2018 | Wakasono | .......... | A63F 13/5378 |

\* cited by examiner

DISPLAY SYSTEM, METHOD OF CONTROLLING DISPLAY SYSTEM, IMAGE GENERATION CONTROL PROGRAM, AND COMPUTER-READABLE STORAGE MEDIUM

TECHNICAL FIELD

The present invention, in one aspect thereof, relates, for example, to image generating devices.

BACKGROUND ART

MR presentation systems have been and are being developed that provide for an MR (mixed reality) display by superimposing a virtual object on a real world background. Patent Literature 1 discloses an invention that is an example of such an MR presentation system (see FIG. 12). FIG. 12 is a drawing illustrating an example of the conventional MR game system.

In the MR game system described in Patent Literature 1, as shown in FIG. 12, an AR (augmented reality) game device 104 synthesizes a subjective viewpoint image from a real-world image captured in the real world by an HMD (head mounted display) 107 worn by a player 101 and an image of a virtual object 102 as viewed from a viewpoint of the player 101 (i.e., a "subjective viewpoint") and displays the synthesized subjective viewpoint image using the HMD 107. The AR game device 104 also synthesizes an objective viewpoint image from an objective viewpoint real-world image captured by an objective viewpoint imaging camera 103 and an image of the virtual object 102 as viewed by a non-player, third person (i.e., an "objective viewpoint") and displays the synthesized objective viewpoint image on a display device 106 for viewing by the third person (spectator).

The invention is hence capable of generating MR game images as viewed from the subjective viewpoint of the player 101 and also generating panoramic MR game images as viewed from the spectator's viewpoint (objective viewpoint) or MR game images as viewed from a viewpoint desired by the spectator.

CITATION LIST

Patent Literature

Patent Literature 1: Japanese Unexamined Patent Application Publication, Tokukai, No. 2001-195601A (Publication Date: Jul. 19, 2001)

SUMMARY OF INVENTION

Technical Problem

The MR game system of Patent Literature 1 generates a spectator-viewing-intended image from an objective viewpoint real-world image captured by the objective viewpoint imaging camera 103. Therefore, the spectator-viewing-intended image represents the relative positions of the players 101 and the environment that surrounds the space in which the players 101 are present. Depending on the types of games handled by the MR game system, however, the spectator-viewing-intended image is not required to represent these relative positions and surrounding environment.

An aspect of the present invention has been made in view of these problems. It is an object of an aspect of the present invention to provide an image generating device capable of presenting a more effective image for viewing by a third person in accordance with the progress of a prescribed story in a game in which a virtual object is generated.

Solution to Problem

To address the problems, the present invention, in one aspect thereof, is directed to an image generating device that generates an image, the device including an image generating unit configured to generate a third person viewpoint image of a virtual space as viewed from a virtual space viewpoint of a non-user, third person in accordance with progress of a prescribed story of a game in which a virtual object is generated, the virtual space containing an image of the virtual object and either an image of at least one user himself/herself of the game or an image of an avatar representing the user.

Advantageous Effects of Invention

The present invention, in an aspect thereof, has an advantage of being able to present a more effective image to a third person in accordance with the progress of the prescribed story of a game.

Figure 2:
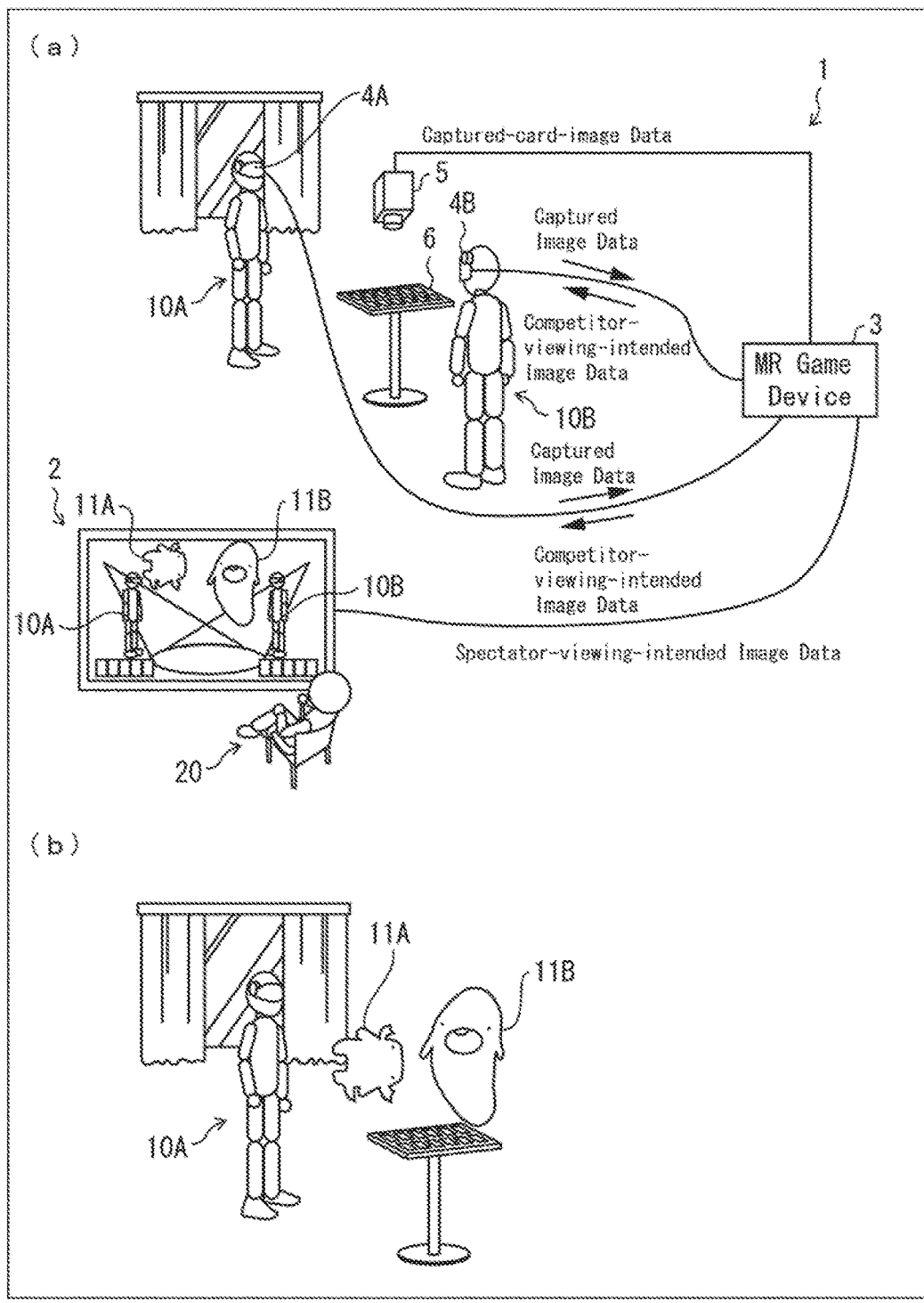

Portion (a) of FIG. 2 is a drawing illustrating an example MR game system in accordance with Embodiment 1 of the present invention, and (b) of FIG. 2 is a drawing representing an example competitor-viewing-intended image displayed by an HMD used in the MR game system.

Figure 3:
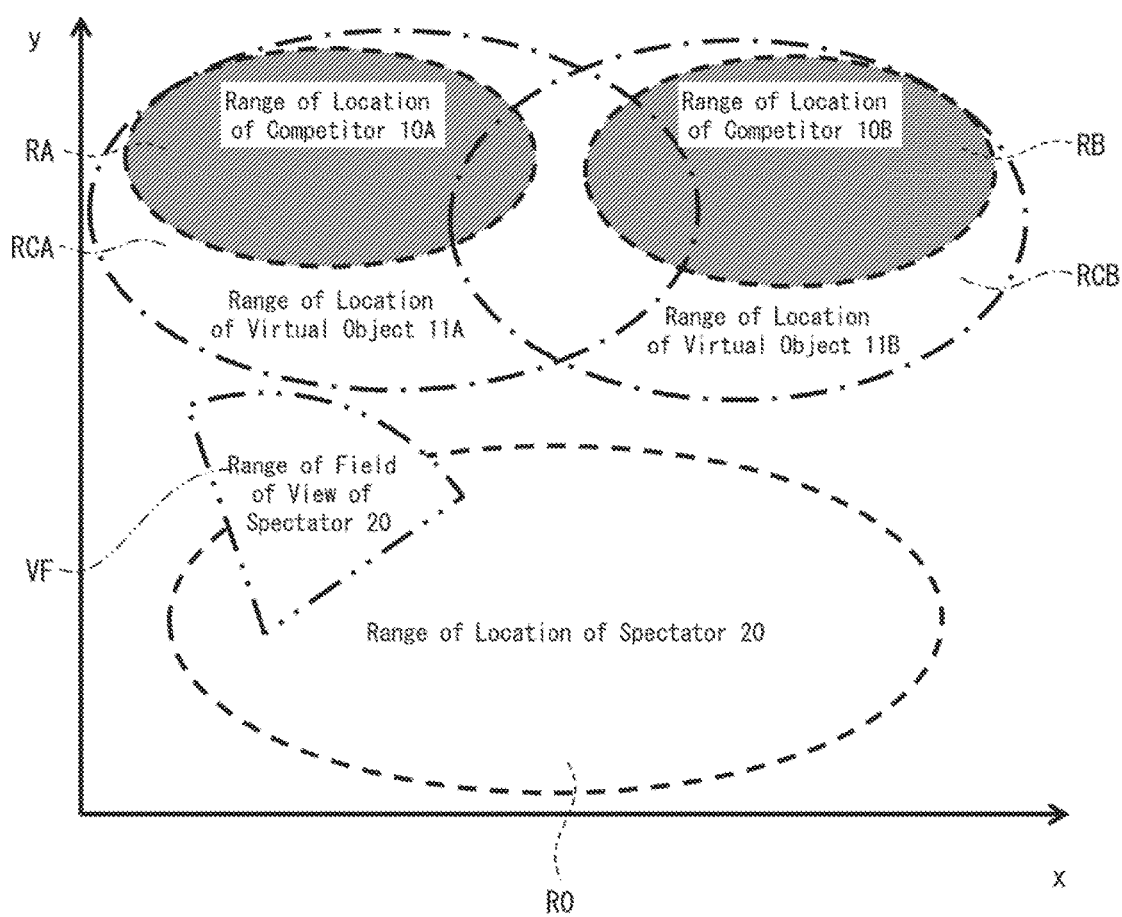

FIG. 3 is a conceptual diagram representing example settings of the locations of images of virtual objects and competitors arranged in a spectator-viewing-intended image, the locations being determined by a position determining unit in the MR game device.

Figure 4:
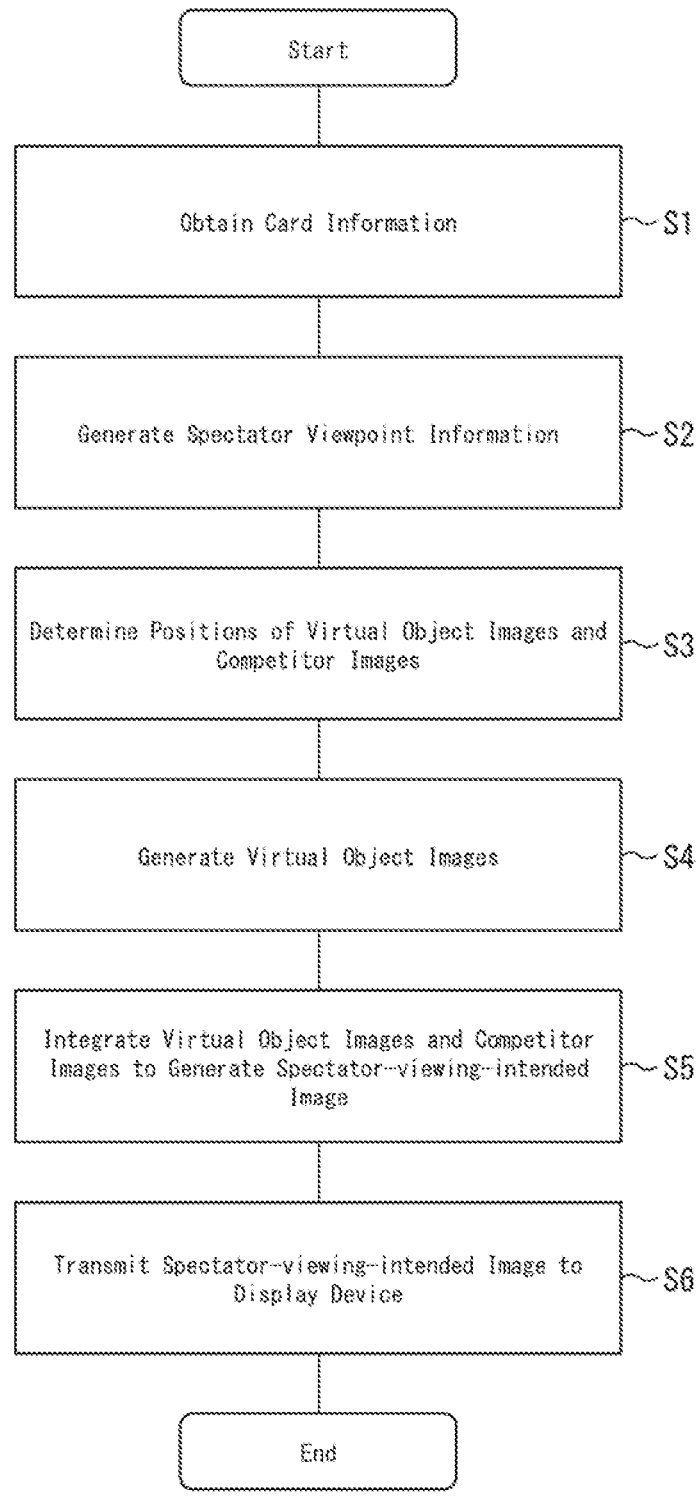

FIG. 4 is a flow chart depicting an example process carried out by the MR game device.

Figure 5:
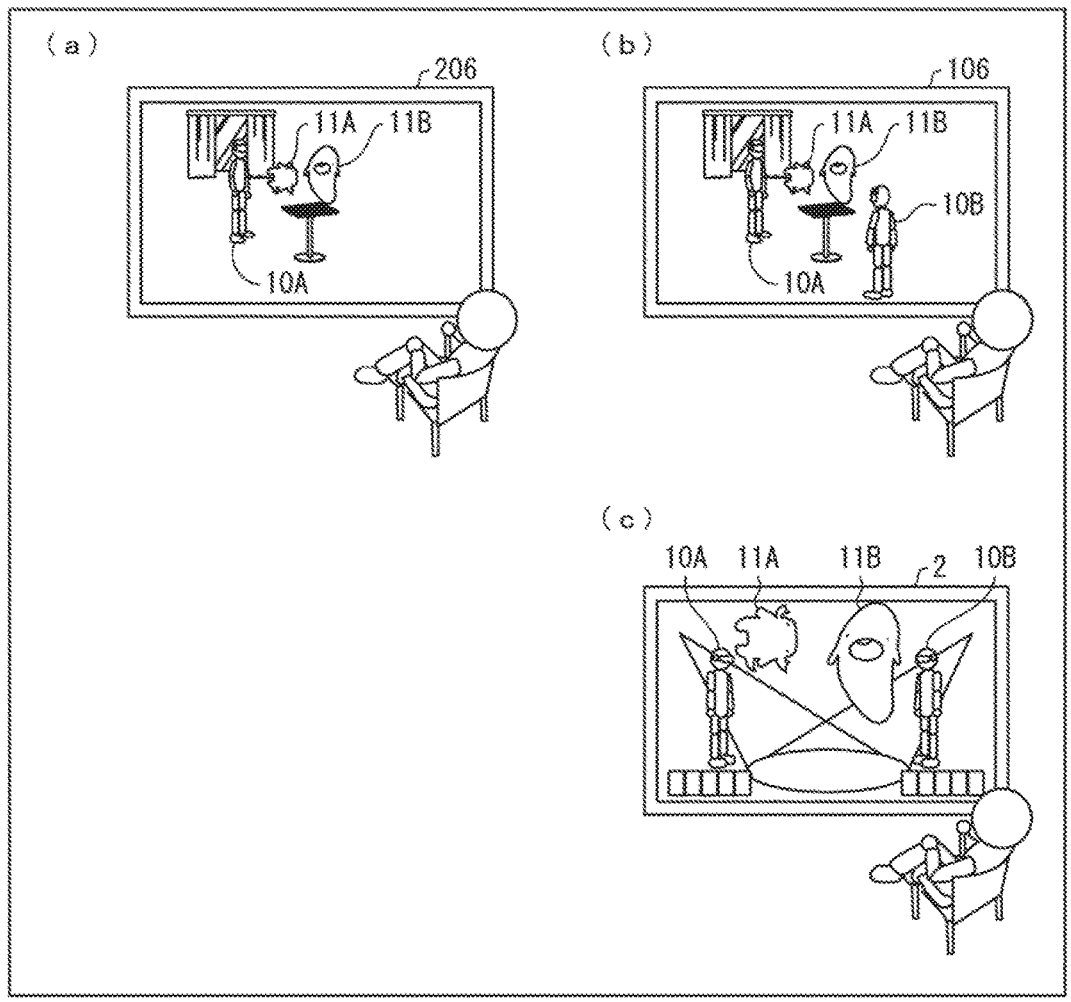

FIG. 5 is a drawing representing example spectator-viewing-intended images. Portions (a) and (b) of FIG. 5 are drawings representing conventional spectator-viewing-intended images, whereas (c) of FIG. 5 is a drawing representing a spectator-viewing-intended image in accordance with Embodiment 1 of the present invention.

Figure 6:
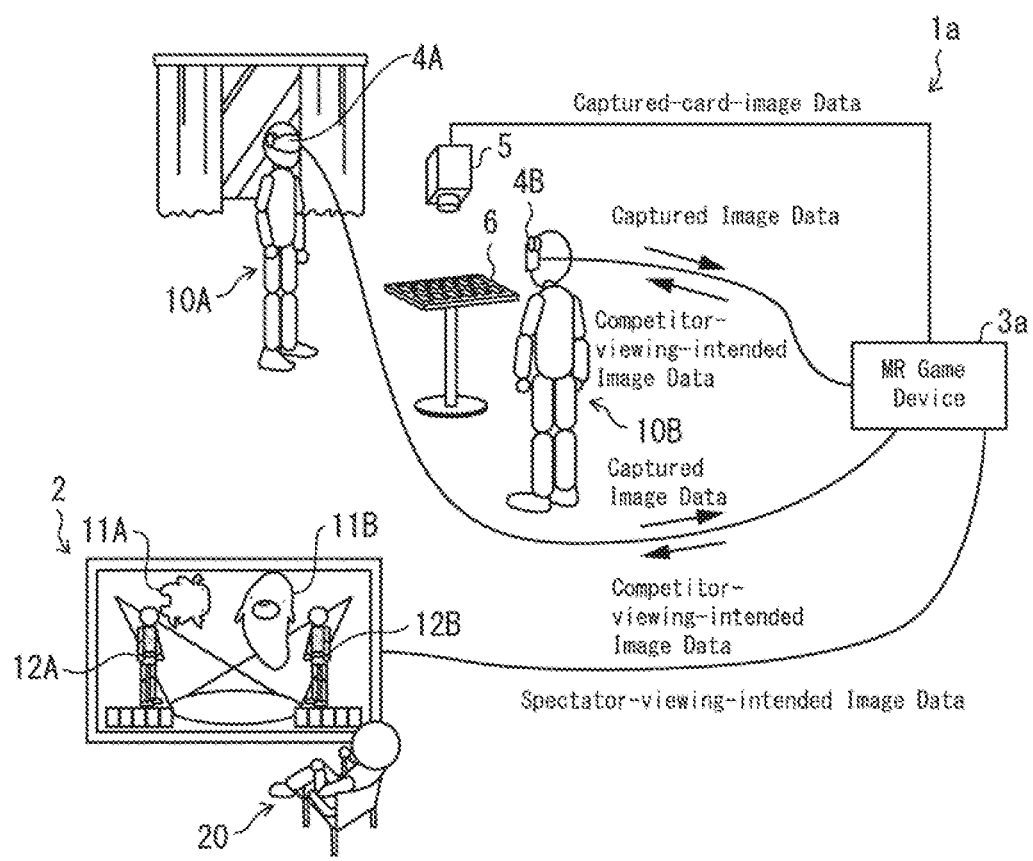

FIG. 6 is a drawing illustrating an example MR game system in accordance with Embodiment 2 of the present invention.

Figure 7:
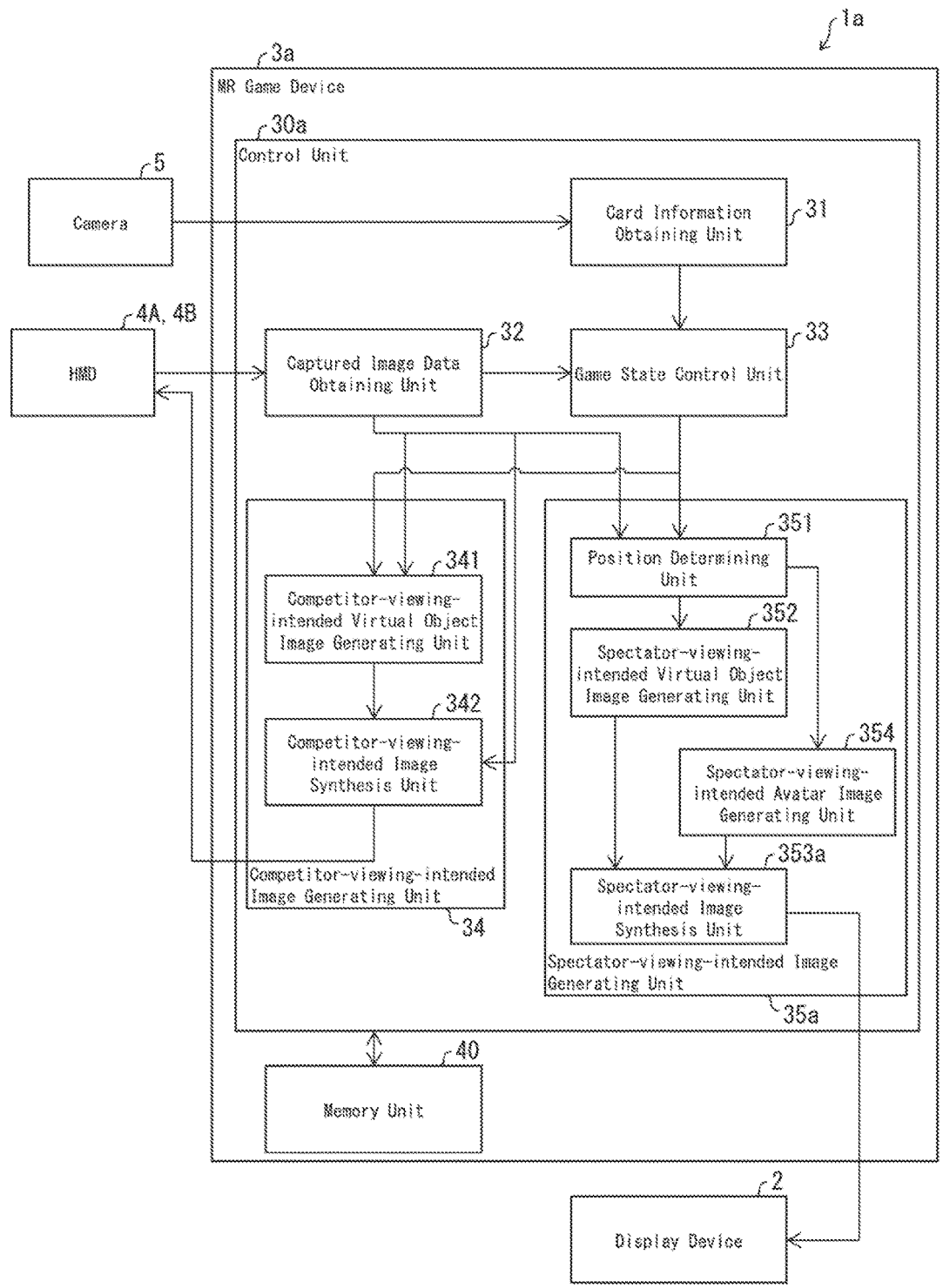

FIG. 7 is a diagram of an example configuration of an MR game device in accordance with Embodiment 2 of the present invention.

Figure 8:
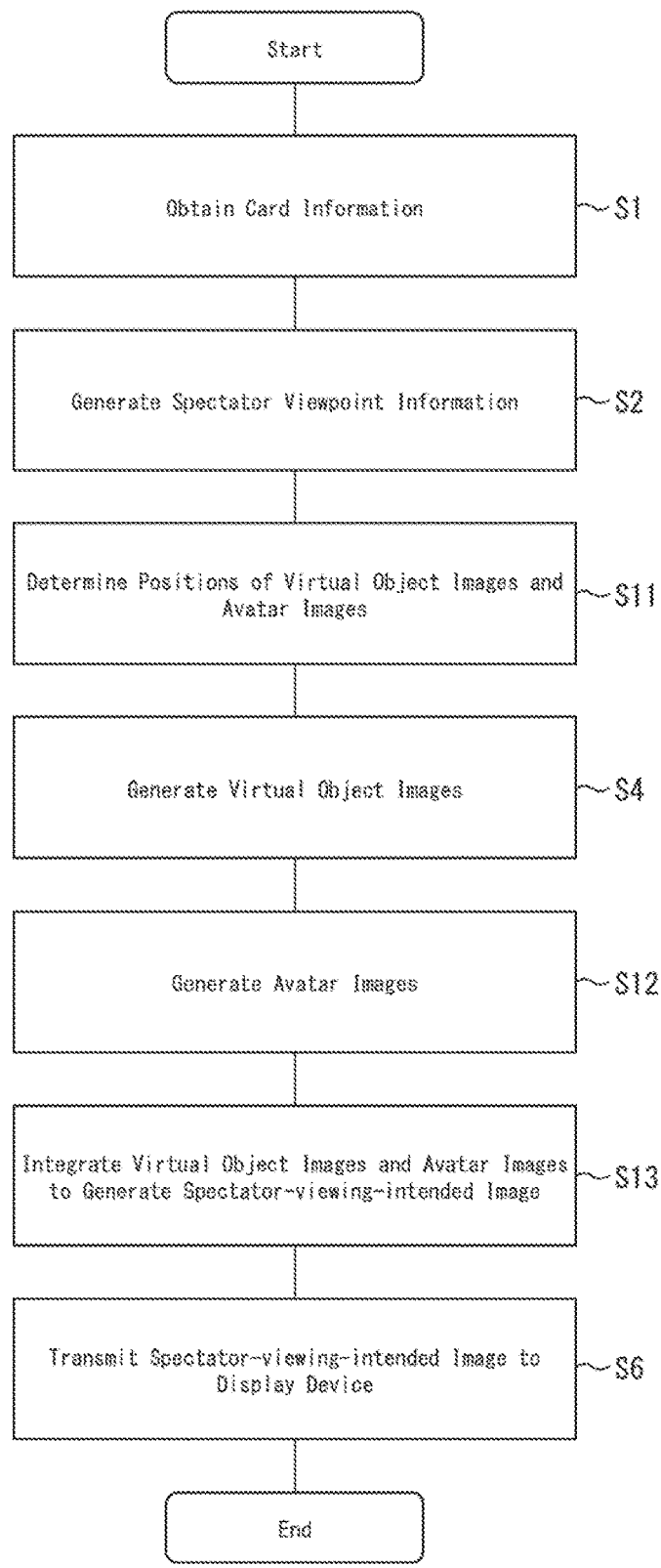

FIG. 8 is a flow chart depicting an example process carried out by the MR game device. FIG, 9 is a drawing illustrating an example MR game system in accordance with Embodiment 3 of the present invention.

Figure 10:
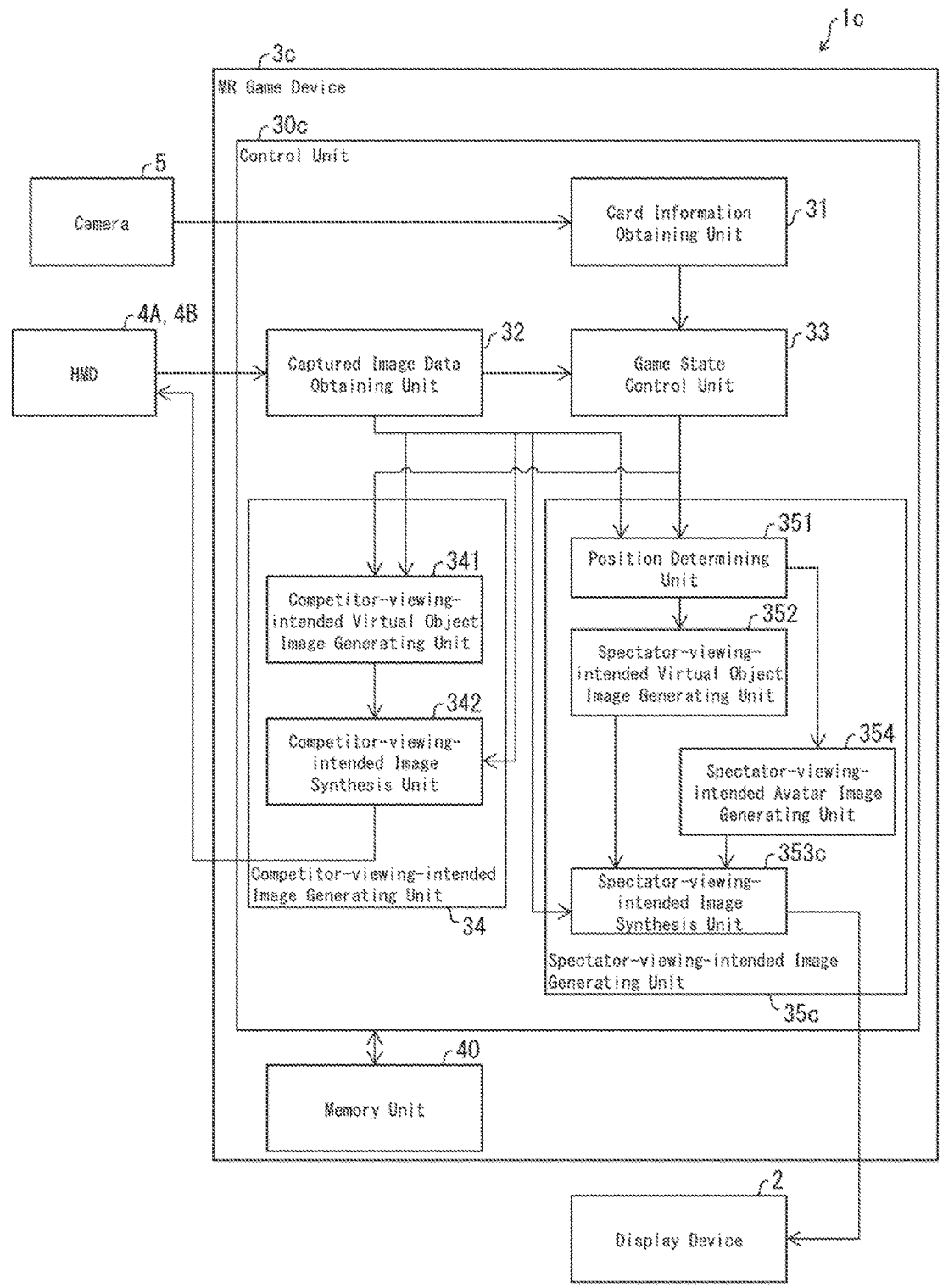

FIG. 10 is a diagram of an example configuration of an MR game device in accordance with Embodiment 4 of the present invention.

Figure 11:
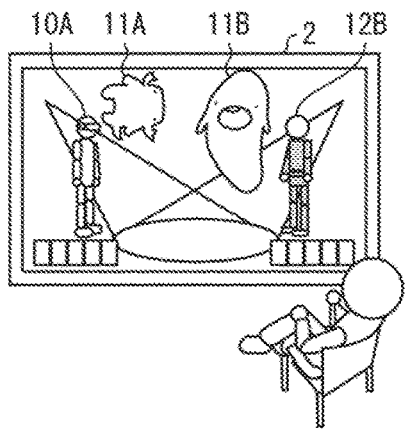

FIG. 11 is a drawing representing an example spectator-viewing-intended image generated by the MR game device.

Figure 12:
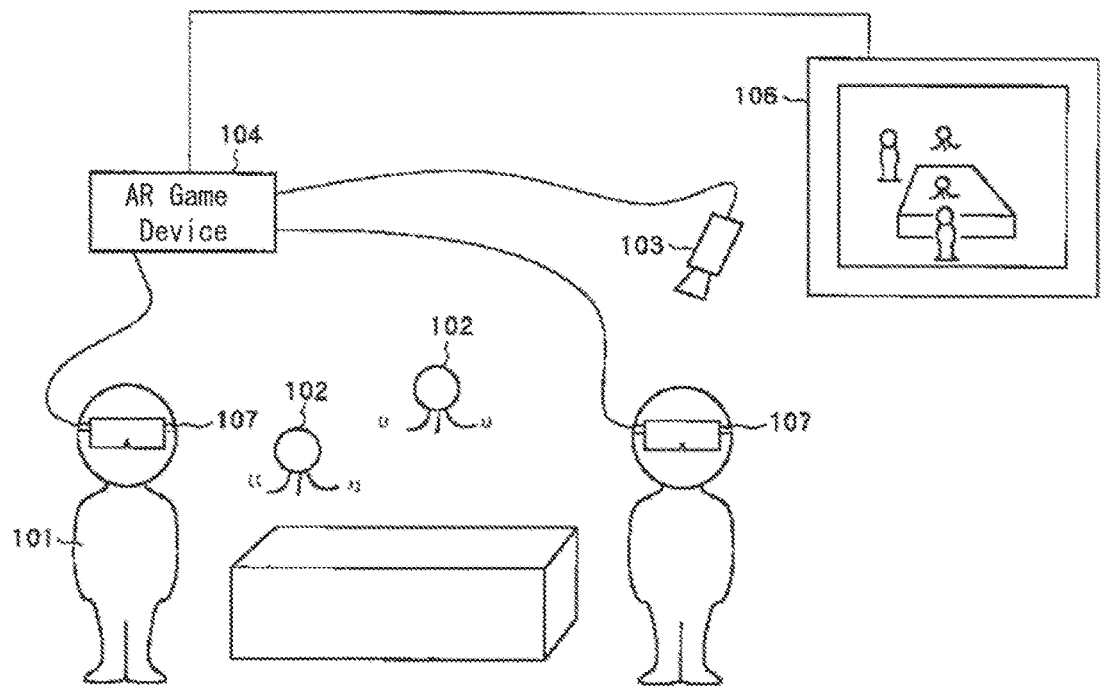

FIG. 12 is a drawing illustrating an example of a conventional MR game system.

DESCRIPTION OF EMBODIMENTS

Embodiment 1

The following will describe an embodiment of the present invention in reference to FIGS. 1 to 5.

Overview of MR Game System 1

Referring to FIG. 2, an MR (mixed reality) game system 1 (display system) will first be described. Portion (a) of FIG. 2 is a drawing illustrating an example of the MR game system 1, Portion (b) of FIG. 2 is a drawing representing an example competitor-viewing-intended image displayed by an HMD (head mounted display) 4B.

The MR game system 1 shown in (a) of FIG. 2 is for providing for a prescribed MR game (software) for use by competitors (may also be referred to as users or players) 10A and 10B. The prescribed MR game may be, for example, a fighting game based on a trading card game or a game in which virtual objects 11A and 11B (details will be given later) are generated. In the current case, which one of the competitors 10A and 10B wins or loses against the other is determined on the basis of the information contained in the cards (trading cards) that are placed on a card stand 6 (game board) by the competitors 10A and 10B. This application describes the present invention assuming that the two competitors 10A and 10B fight each other in the MR game; alternatively, three or more competitors may be involved in the fighting.

The MR game system 1 generates MR images in accordance with the progress of a prescribed story of a prescribed MR game (will be referred to as the "progress of the MR game") and provides these MR images for viewing by the competitors 10A and 10B and a non-competing spectator 20.

The MR game system 1 includes a display device 2, an MR game device 3 (image generating device), an HMD 4A, the HMD 4B, a card imaging camera 5, and the card stand 6. The display device 2, the HMDs 4A and 4B, and the card imaging camera 5 are all connected to the MR game device 3 via cables. Each of these devices may be connected to the MR game device 3 wirelessly, not via cables (not via wired links), as long as the device can exchange data with the MR game device 3.

The display device 2 is for displaying spectator-viewing-intended images (third person viewpoint images) generated by the MR game device 3 in accordance with the progress of the MR game. The display device 2 is built, for example, around an LCD (liquid crystal display). The MR game system 1 may include two or more display devices 2, in which case the spectator 20 in various locations can enjoy viewing the progress of the MR game.

The MR game device 3 performs processes (e.g., generates images of the virtual objects 11A and 11B, competitor-viewing-intended images, and a spectator-viewing-intended image) in accordance with the progress of the MR game on the basis of the information stored in the MR game device 3 or the captured-card-image data obtained by the card imaging camera 5. The MR game device 3 transmits competitor-viewing-intended image data representing the competitor-viewing-intended images to the HMDs 4A and 4B and also outputs spectator-viewing-intended image data representing the spectator-viewing-intended image to the display device 2.

The MR game device 3 generates a composite image of the competitor 10A (10B) contained in a real-world image captured through actual photographing of the real world and fed from the HMD 4A (4B) and the virtual objects 11A and 11B as viewed by the competitor 10A (10B). This composite image is transmitted to the HMD 4A (4B) as a competitor-viewing-intended image. For example, the competitor-viewing-intended image data representing the competitor-viewing-intended image as viewed by the competitor 10B that is shown in (b) of FIG. 2 is transmitted to the HMD 4B worn by the competitor 10B. In other words, the competitor 10B views a competitor-viewing-intended image containing images of the virtual objects 11A and 11B arranged in a real-world image of a real-world space containing the competitor 10A as viewed by the competitor 10B.

The MR game device 3 also generates a composite image of the virtual objects 11A and 11B as viewed from an arbitrary direction and either the competitors 10A and 10B themselves or the avatars representing the competitors 10A and 10B on a virtual space background as viewed from an arbitrary direction by the spectator 20. This composite image is transmitted to the display device 2 as a spectator-viewing-intended image. The present embodiment describes a case in which the MR game device 3 generates a spectator-viewing-intended image containing images of the competitors 10A and 10B themselves.

The HMDs 4A and 4B are worn respectively by the competitors 10A and 10B on their heads. Each HMD 4A and 4B displays the competitor-viewing-intended image generated by the MR game device 3 on a display device (not shown) mounted thereto. The HMDs 4A and 4B each also capture an image of a real-world space containing an opposing competitor using an image capturing device (not shown) mounted thereto. For example, the HMD 4A worn by the competitor 10A captures an image of a real-world space containing the opposing competitor 10B. The HMDs 4A and 4B transmit the captured real-world images of the real world to the MR game device 3 as captured image data.

The card imaging camera 5 captures an image of all the cards placed on the card stand 6 and transmits the captured image to the MR game device 3 as captured-card-image data. The photographing of the card by the card imaging camera 5 enables a card information obtaining unit 31 (details will be given later) to read the card information contained in the card. From this card information, the MR game device 3 generates, for example, characters as images of the virtual objects 11A and 11B for inclusion in the competitor-viewing-intended images and spectator-viewing-intended image.

If the MR game device 3 is capable of obtaining card information, the card imaging camera 5 may be replaced by a scanner or like reading unit.

The card stand 6 is a real-world object used in the MR game. The competitors 10A and 10B each place one or more of their cards in predetermined locations on the card stand 6.

Details of MR Game Device 3

Figure 1:
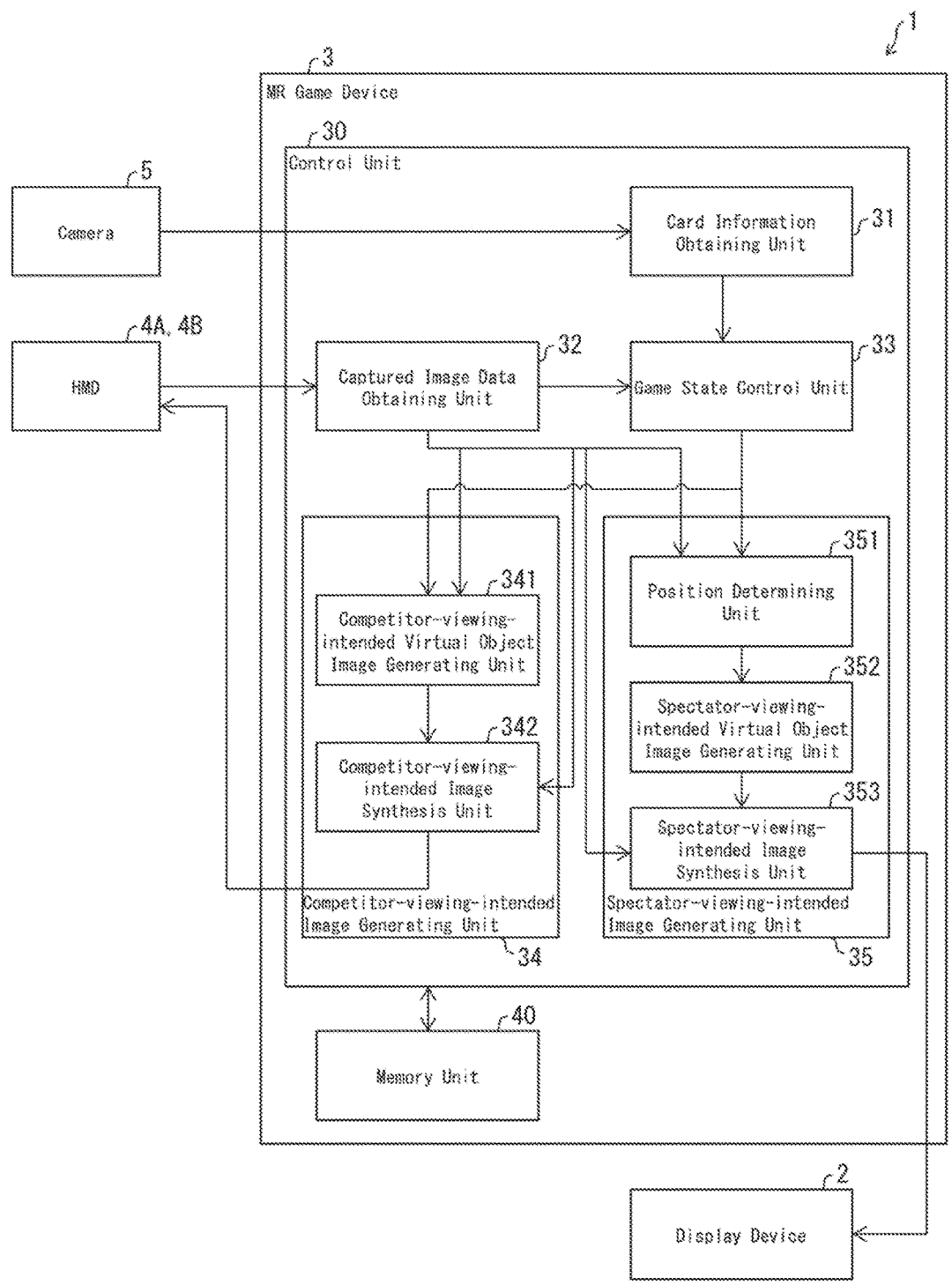
FIG 1 is a diagram of an example configuration of an MR game device in accordance with Embodiment 1 of the present invention.

Next, the MR game device 3 will be described in detail in reference to FIGS. 1 to 3. FIG. 1 is a diagram of an example configuration of the MR game device 3 in accordance with the present embodiment. FIG. 3 is a conceptual diagram representing example settings of the locations of images of the virtual objects 11A and 11B and images of the competitors 10A and 10B arranged in a spectator-viewing-intended image, the locations being determined by a position determining unit 351.

Referring to FIG. 1, the MR game device 3 includes a control unit 30 and a memory unit 40. The control unit 30 generally controls the MR game device 3 and includes the card information obtaining unit 31, a captured image data obtaining unit 32, a game state control unit 33, a competitor-viewing-intended image generating unit 34, and spectator-viewing-intended image generating unit 35.

The card information obtaining unit 31 is placed on the card stand 6. Upon receiving the captured-card-image data containing the card generated through photographing by the card imaging camera 5, the card information obtaining unit 31 analyzes the captured image represented by the captured-card-image data and identifies figures, symbols, and the like on the cards in the captured image, to obtain card information from the cards.

The cards contain card information (card type information) prepared for the MR game. The card information may be, for example, character information representing characters of the MR game, field information representing a field (background such as the sea or outer space) in which characters fight each other, and function information representing various functions such as character highlighting (zoom-in).

The card information obtaining unit 31 also determines the positions of the cards in the captured image to recognize the positions of the cards on the card stand 6. The card information obtaining unit 31 then associates the positions of the cards on the card stand 6 with the obtained card information for transmission to the game state control unit 33.

The captured image data obtaining unit 32 is for obtaining captured image data generated through imaging by the HMDs 4A and 4B. The captured image data obtaining unit 32 analyzes the captured image data obtained from the HMD 4A on the basis of information such as the angle of view, focal length, and distortion of the image capturing devices mounted to the HMD 4A, to detect a real-world viewpoint of the competitor 10A (specifically, the location of the competitor 10A and the direction of his/her line of sight in the real world). The captured image data obtaining unit 32 analyzes the captured image data obtained from the HMD 4B in a similar manner to detect a real-world viewpoint of the competitor 10B. In summary, the captured image data obtaining unit 32 functions as a competitor viewpoint detection unit that detects competitors' viewpoints. The captured image data obtaining unit 32 transmits information representing the viewpoints of the competitors 10A and 10B to the game state control unit 33.

The information representing the viewpoints of the competitors 10A and 10B includes location information (x, y, z) representing the location of the competitor 10A or 10B in the real world (z represents the eye level) and information representing the direction of the line of sight of the competitor A or B that has a starting point at the location indicated by the location information. The information representing the direction of the line of sight of the competitor A or B is given as a (unit) direction vector (Vx, Vy, Vz) or a combination of $\theta$ (azimuth) and $\varphi$ (angle of elevation or depression).

The direction of the line of sight of the competitor 10A may be precisely determined, for example, using the card stand 6 in the captured image data as a reference point (marking). If the HMDs 4A and 4B are provided with various sensors such as acceleration sensors, the captured image data obtaining unit 32 may obtain the information outputted by these sensors (e.g., the information representing the locations and postures of the HMDs 4A and 4B (location and posture parameters)), as well as the captured image data, from the HMDs 4A and 4B. When this is the case, the captured image data obtaining unit 32 is capable of calculating the directions of the lines of sight of the competitors 10A and 10B by additionally using these location and posture parameters.

The game state control unit 33 is for managing the progress of the MR game on the basis of sequentially obtained card information.

Upon obtaining the card information associated with the positions of the cards placed on the card stand 6 from the card information obtaining unit 31, the game state control unit 33 identifies the combination of the cards and the type of card information for both the competitors 10A and 10B.

The game state control unit 33 matches the information obtained for the competitors 10A and 10B with the predetermined rules of the MR game, to determine the situation of fighting between the competitors 10A and 10B at a point in time (e.g., which of the competitors 10A and 10B is offensive and defensive, and who is having an upper hand over who) based on the situation of fighting at a preceding point in time. Based on results of this determination, the game state control unit 33 determines competitor viewpoint information that represents the virtual objects 11A and 11B that will be generated by the competitor-viewing-intended image generating unit 34 and that further represents the conditions of the virtual objects 11A and 11B (e.g., information representing the orientations, postures, and sizes of the characters that are to be the virtual objects 11A and 11B). The game state control unit 33 then outputs the competitor viewpoint information to the competitor-viewing-intended image generating unit 34.

This competitor viewpoint information includes supplementary information such as information indicating, for example, the strength of a character on a card and information reflecting the progress of the game (i.e., information representing the scores, turn counts, and like statistics of the competitors 10A and 10B).

The game state control unit 33 also generates spectator viewpoint information (third person viewpoint information) on the basis of the results of the aforementioned determination, for transmission to the spectator-viewing-intended image generating unit 35. The spectator viewpoint information is related to the progress of the MR game and to the virtual space viewpoint of the spectator 20. In other words, the spectator viewpoint information may be any information suited for graphic rendering of the MR game that can frequently alter with the situation of fighting.

Specifically, the spectator viewpoint information includes at least (1) field information representing a field in which a prescribed story of an MR game progresses with the virtual objects 11A and 11B appearing therein, (2) field viewpoint information representing a viewpoint from which the field is viewed, and (3) object alteration information representing alterations in an object of interest in the field that may occur in accordance with the progress of the prescribed story. This spectator viewpoint information may be included in the card information and may be contained in the memory unit 40.

The field is a virtual space in which the competitors 10A and 10B fight each other and may be, for example, a stadium, the sea, or outer space. The field information represents these stadium, sea, outer space, and other various fields.

The viewpoint represented by the field viewpoint information (i.e., the location of a virtual viewpoint of the spectator 20 in the field and the direction of the line of sight of the spectator 20) may he (1) any location in the front of the field and a direction from that location, (2) any location in the rear of the field and a direction from that location (that is opposite the direction from a location in the front of the field), (3) if an image of the competitor 10A is arranged in the field, any location behind the competitor 10A and a direction from that location, (4) if an image of the competitor 10B is arranged in the field, any location behind the competitor 10B and a direction from that location, or (5) any location above the field and a direction from that location. The direction from a location in the front of the field as in (1) refers to a direction in which the images of the competitors 10A and 10B, fighting in the field, are viewed from the side. The direction from a location above the field as in (5) refers to a direction in which the images of the competitors 10A and 10B in the field are viewed from above.

The field viewpoint information may include a viewpoint located, for example, anywhere on the surface of a virtual sphere that has a prescribed radius with a center at the center of the field. In such a case, the location information representing the location of a viewpoint included in the field viewpoint information is given as a set of coordinates of a point on the surface of the sphere.

The object alteration information represents, for example, a magnification ratio for the competitor 10A or 10B, a magnification ratio for the virtual object 11A or 11B, and when a prescribed effect (e.g., an offensive or defensive item) is to be generated, a magnification ratio for an object embodying that effect. This object may include, in addition to an image of an object that appears with the effect, images of the competitors 10A and 10B, images of the virtual objects 11A and 11B, images of avatars 12A and 12B detailed in Embodiment 2, and any other object that may appear in the field.

The game state control unit 33, as described above, generates, on the basis of the results of the aforementioned determination, information representing the virtual objects 11A and 11B that will be generated and the conditions of the virtual objects 11A and 11B and supplementary information. In addition, the game state control unit 33, as described above, determines the sizes of the competitors 10A and 10B in a composite image on the basis of the results of the determination. The game state control unit 33 then integrates this set of information into the spectator viewpoint information.

The competitor-viewing-intended image generating unit 34 generates different competitor-viewing-intended images for output to the HMD 4A worn by the competitor 10A and for output to the HMD 4B worn by the competitor 10B. The competitor-viewing-intended image generating unit 34 includes a competitor-viewing-intended virtual object image generating unit 341 and a competitor-viewing-intended image synthesis unit 342.

Upon obtaining the competitor viewpoint information from the game state control unit 33, the competitor-viewing-intended virtual object image generating unit 341 specifies the positions and states (conditions) of the virtual objects 11A and 11B that will be generated and arranged in the competitor-viewing-intended images respectively for the competitors 10A and 10B (more specifically, for the HMDs 4A and 4B), on the basis of the competitor viewpoint information and the information representing the viewpoints of the competitors 10A and 10B obtained from the captured image data obtaining unit 32. The competitor-viewing-intended virtual object image generating unit 341 then retrieves 3D models of the characters to be generated as the virtual objects 11A and 11B from the memory unit 40 and generates images of the virtual objects 11A and 11B (virtual object images) as viewed from the competitor 10A on the basis of the information representing the orientations, postures, and sizes of the characters contained in the competitor viewpoint information. If the competitor viewpoint information contains supplementary information related to the virtual objects 11A and 11B, the supplementary information may be added to the images of the virtual objects 11A and 11B. The competitor-viewing-intended virtual object image generating unit 341 sends, to the competitor-viewing-intended image synthesis unit 342, information representing the images and arrangement positions of the virtual objects 11A and 11B generated respectively for transmission to the HMDs 4A and 4B.

Specifically, a coordinate transform matrix M1 that transforms from an object coordinate system to an image coordinate system for the HMD 4A is calculated by a method that will be described later in detail, on the basis of the information representing the arrangement positions (display positions), orientations, postures, and sizes of the virtual objects 11A and 11B and the information representing the viewpoint of the competitor 10A obtained from the captured image data obtaining unit 32. By multiplying the coordinate values of the apices of each polygon constituting the virtual objects 11A and 11B in an object coordinate system by the calculated coordinate transform matrix M1, the coordinate values of the apices of each polygon constituting the virtual objects 11A and 11B in an image coordinate system are calculated. The images of the virtual objects 11A and 11B are then generated as viewed from the viewpoint (location and posture) of the HMD 4A.

The coordinate transform matrix M1 is calculated in the following manner. A coordinate transform matrix Mm that transforms from an object coordinate system to a global coordinate system is calculated on the basis of information on the arrangement positions and postures of the virtual objects 11A and 11B. A coordinate transform matrix Mc1 that transforms from a global coordinate system to a camera coordinate system is calculated on the basis of the information representing the viewpoint of the competitor 10A (or information on the viewpoint (location and posture) of the HMD 4A). A coordinate transform matrix Md1 that performs a viewpoint transformation from a camera coordinate system to an image coordinate system is also calculated on the basis of the information representing the viewpoint of the competitor 10A (or information on, for example, the angle of view, focal length, and distortion of the image capturing device mounted to the HMD 4A). The transform matrix M1 for transformation from an object coordinate system to an image coordinate system for the HMD 4A is then obtained as M1=Md1Mc1Mm.

A method has been described of generating the images of the virtual objects 11A and 11B that are displayed by the HMD 4A. A similar method is used to generate the images of the virtual objects 11A and 11B that are displayed by the HMD 4B.

The competitor-viewing-intended image synthesis unit 342, in response to obtaining the images of the virtual objects 11A and 11B that are generated for display by the HMD 4A, integrates the images of the virtual objects 11A and 11B into the captured image data obtained by the captured image data obtaining unit 32 from the HMD 4A. If the images of the virtual objects 11A and 11B contain additional, supplementary information, the competitor-viewing-intended image synthesis unit 342 further integrates the supplementary information into the captured image data. The competitor-viewing-intended image synthesis unit 342 transmits the synthesized image obtained by the integration as competitor-viewing-intended image data to the HMD 4A. In response to obtaining the competitor-viewing-intended image data, the HMD 4A displays a competitor-viewing-intended image on a display device thereof.

In addition, the competitor-viewing-intended image synthesis unit 342, upon obtaining the images of the virtual objects 11A and 11B that are generated for display by the HMD 4B, likewise integrates the images of the virtual objects 11A and 11B into the captured image data obtained by the captured image data obtaining unit 32 from the HMD 4B. The competitor-viewing-intended image synthesis unit 342 then transmits the synthesized image obtained by the integration as competitor-viewing-intended image data to the HMD 4B, so that the competitor-viewing-intended image is displayed on a display device of the HMD 4B.

The spectator-viewing-intended image generating unit 35 is for generating a spectator-viewing-intended image for output to the display device 2. Specifically, the spectator-viewing-intended image generating unit 35 provides a spectator-viewing-intended MR image (spectator-viewing-intended image) as viewed by the spectator 20 (as viewed from spectator's viewpoint). This spectator-viewing-intended image differs from the competitor-viewing-intended MR image (competitor-viewing-intended image) as viewed by the competitor 10A or 10B (as viewed from a subjective viewpoint). The spectator-viewing-intended image generating unit 35 includes the position determining unit 351, a spectator-viewing-intended virtual object image generating unit 352 (virtual object image generating unit), and a spectator-viewing-intended image synthesis unit 353 (image generating unit).

The position determining unit 351 specifies the field in which the virtual objects 11A and 11B fight each other and the direction in which the spectator 20 views the field (direction in which the spectator 20 can view the progress of the fight between the virtual objects 11A and 11B), on the basis of the spectator viewpoint information obtained from the game state control unit 33. The position determining unit 351 then retrieves an image of the field as viewed from the viewpoint of the spectator 20 from the memory unit 40.

The position determining unit 351 also generates arrangement position information on the basis of the results of the aforementioned determination made by the game state control unit 33 and the information representing the viewpoints of the competitors 10A and 10B obtained from the captured image data obtaining unit 32. The arrangement position information represents the positions of the virtual objects 11A and 11B that will be generated and arranged in a field in a virtual space (virtual field) and the positions of the competitors 10A and 10B that will be generated and arranged in this virtual field. The position determining unit 351 transmits the generated arrangement position information to the spectator-viewing-intended virtual object image generating unit 352 and the spectator-viewing-intended image synthesis unit 353.

Specifically, the position determining unit 351 determines first display positions where images of the virtual objects 11A and 11B will be displayed and second display positions where images of the competitors 10A and 10B will be displayed. In other words, the position determining unit 351 adjusts the positions of the images of the virtual objects 11A and 11B and the positions of the images of the competitors 10A and 10B in a spectator-viewing-intended image.

Now, referring to FIG. 3, example settings will be described of the positions of the images of the virtual objects 11A and 11B and the positions of the images of the competitors 10A and 10B in a spectator-viewing-intended image. The settings are made by the position determining unit 351. FIG. 3 shows the locations of the competitors 10A and 10B, the locations of the virtual objects 11A and 11B, and the location of the spectator 20 in the virtual field in the form of a conceptual drawing as they are viewed from above the spectator 20.

As shown in FIG. 3, the spectator 20 is located in a range RO and views a part of the field within a prescribed angle (within a range VF of the field of view of the spectator 20) from that location. The positions of the virtual objects 11A and 11B and the competitors 10A and 10B in the virtual field are determined within that field of view, so that the spectator 20 can primarily view the whole images of the competitors 10A and 10B and virtual objects 11A and 11B from such a viewpoint. In addition, the location of the spectator 20 and the range VF of the field of view of the spectator 20 in the range RO may be altered on the basis of the spectator viewpoint information (particularly, the field viewpoint information and object alteration information).

FIG. 3 shows the range RO of the location of the spectator 20 close to the x-axis (y=0). Alternatively, the range RO of the location of the spectator 20 may be shown close to the maximum end of the y-axis (i.e., near the top of the graph of FIG. 3), close to the y-axis (x=0) (i.e., in the left of the graph of FIG. 3), or close to the maximum end of the x-axis (i.e., in the right of the graph of FIG. 3) on the basis of the spectator viewpoint information. The range RO of the location of the spectator 20 may also spread perpendicular to the x-y plane.

In this manner, the viewpoint of the spectator 20 is realized by a virtual camera, and the range VF of the field of view coincides with the angle of view of the virtual camera. Accordingly, in the MR game device 3, spectator viewpoint information is generated in accordance with the progress of the game, and a spectator-viewing-intended image is generated on the basis of the spectator viewpoint information, such that the location, angle of view, and other settings of the virtual camera can be altered freely in accordance with the progress of the game.

The competitors 10A and 10B are located respectively in a range RA and in a range RB in the virtual field. The locations of the competitors 10A and 10B do not need to be determined in such a manner as to faithfully represent the real locations of the competitors 10A and 10B in a real-world space on the basis of the captured image data obtained by the captured image data obtaining unit 32. For example, the competitors 10A and 10B may be positioned face to face.

The virtual objects 11A and 11B are located respectively in a range RCA that surrounds the range RA of the location of the competitor 10A and a range RCB that surrounds the range RB of the location of the competitor 10B. The virtual objects 11A and 11B only need to be set up in such a manner that in each of the ranges RCA and RCB, no contradictions occur between the viewpoint of the spectator 20 and the positions of the competitors 10A and 10B (for example, the virtual objects 11A and 11B may be located in such locations that the competitors 10A and 10B do not overlap the virtual objects 11A and 11B). Namely, the relative positions of the competitors 10A and 10B, the virtual objects 11A and 11B, and the spectator 20 may be restricted by preparing in advance sets of parameters that will lead to no such contradictions.

The spectator-viewing-intended virtual object image generating unit 352, obtaining the arrangement position information representing the first and second display positions determined by the position determining unit 351, retrieves 3D models of the characters to be generated as the virtual objects 11A and 11B from the memory unit 40 on the basis of the spectator viewpoint information. The spectator-viewing-intended virtual object image generating unit 352 then generates images of the virtual objects 11A and 11B as viewed by the spectator 20 on the basis of the information representing the orientations, postures, and sizes of the characters contained in the spectator viewpoint information. If the spectator viewpoint information contains supplementary information related to the virtual objects 11A and 11B, the supplementary information may be added to the images of the virtual objects 11A and 11B. The images of the virtual objects 11A and 11B as viewed by the spectator 20 are generated in a manner similar to the manner by which the images of the virtual objects 11A and 11B as viewed by the competitor 10A or 10B are generated. The spectator-viewing-intended virtual object image generating unit 352 transmits, to the spectator-viewing-intended image synthesis unit 353, information representing the generated images of the virtual objects 11A and 11B as viewed by the spectator 20.

The spectator-viewing-intended image synthesis unit 353 generates a spectator-viewing-intended image from the spectator viewpoint information generated by the game state control unit 33. Specifically, the spectator-viewing-intended image synthesis unit 353 integrates the images of the virtual objects 11A and 11B generated by the spectator-viewing-intended virtual object image generating unit 352 into the image representing the field as viewed from the viewpoint of the spectator 20 at the first display positions determined by the position determining unit 351. If the images of the virtual objects 11A and 11B contain additional, supplementary information, the spectator-viewing-intended image synthesis unit 353 further integrates the supplementary information into that image representing the field.

The spectator-viewing-intended image synthesis unit 353 analyzes the captured image data obtained by the captured image data obtaining unit 32 from the HMDs 4A and 4B, to extract images of the competitors 10A and 10B. The spectator-viewing-intended image synthesis unit 353 integrates the extracted images of the competitors 10A and 10B into the image representing the field as viewed from the viewpoint of the spectator 20 at the second display positions determined by the position determining unit 351. The spectator-viewing-intended image synthesis unit 353 superimposes the images of the competitors 10A and 10B at the second display positions after adjusting the sizes of the competitors 10A and 10B in accordance with size-representing information contained in the spectator viewpoint information.

Specifically, the spectator-viewing-intended image synthesis unit 353 arranges the images of the virtual objects 11A and 11B and the images of the competitors 10A and 10B respectively at the first and second display positions determined by the position determining unit 351, to generate a spectator-viewing-intended image of a virtual space containing these images as viewed from the virtual space viewpoint of the spectator 20. The spectator-viewing-intended image synthesis unit 353 then transmits the generated spectator-viewing-intended image as spectator-viewing-intended image data to the display device 2, so that the spectator-viewing-intended image can be displayed on the display device 2.

The images of the competitors 10A and 10B extracted from the captured image data obtained from the HMDs 4A and 4B may be superimposed without processing after the extraction. Alternatively, as an example, image data may be obtained in advance by imaging the competitors 10A and 10B from various angles so that the images of the competitors 10A and 10B can be processed using the image data. This configuration enables generation of images of the competitors 10A and 10B that are facing each other in a virtual field.

The memory unit 40 is, for example, for storing various control programs executed by the control unit 30. The memory unit 40 is built around, for example, a hard disk, flash memory, or like non-volatile storage device. The memory unit 40 also stores, for example, information representing the prescribed rules of the MR game and the image data represented by various information contained in the cards.

Processing in MR Game Device 3

Next, a process performed by the MR game device 3 (method of controlling the MR game device 3) will be described in detail in reference to FIG. 4. The description will focus on the generation of a spectator-viewing-intended image displayed on the display device 2. FIG. 4 is a flow chart depicting an example process carried out by the MR game device 3.

The card information obtaining unit 31 obtains card information (S1), and the game state control unit 33 generates spectator viewpoint information from the card information (S2).

The position determining unit 351 determines, from the spectator viewpoint information generated by the game state control unit 33 and other information, the first display positions where images of the virtual objects 11A and 11B will be displayed and the second display positions where images of the competitors 10A and 10B will be displayed (S3).

The spectator-viewing-intended virtual object image generating unit 352 generates images of the virtual objects 11A and 11B as viewed by the spectator 20 on the basis of the spectator viewpoint information (S4).

The spectator-viewing-intended image synthesis unit 353 superimposes the images of the virtual objects 11A and 11B generated by the spectator-viewing-intended virtual object image generating unit 352 at the first display positions determined by the position determining unit 351 and also superimposes the images of the competitors 10A and 10B extracted from the captured image data obtained by the captured image data obtaining unit 32 at the second display positions determined by the position determining unit 351. These superimpositions generate a spectator-viewing-intended image (S5; image generating step). The spectator-viewing-intended image synthesis unit 353 then transmits spectator-viewing-intended image data representing the spectator-viewing-intended image to the display device 2 (S6).

These steps enable the spectator 20 to view an MR image that contains the images of the virtual objects 11A and 11B and the images of the competitors 10A and 10B on a virtual space background and that alters with the progress of the MR game.

Major Effects of Embodiment 1

Patent Literature 1 reproduces real relative positions of competitors and a surrounding environment in which the competitors are present, by using the image captured by an objective viewpoint imaging camera. The spectator however does not need to recognize the relative positions or surrounding environment in viewing an MR game. The spectator can better enjoy the progress of the game, for example, if the spectator can view an image in which competitors and virtual objects are arranged in arbitrary locations on a background that represents the world view of the game.

As described above, the MR game device 3 of the present embodiment generates a spectator-viewing-intended image of a virtual space containing images of the virtual objects 11A and 11B and images of the competitors 10A and 10B as viewed from a virtual space viewpoint of the spectator 20 in accordance with the progress of the MR game. In other words, the MR game device 3 generates, as a spectator viewing-intended image for viewing by the spectator 20, an image associated with the competitor-viewing-intended images viewed by the competitors 10A and 10B. Therefore, the MR game device 3 may present a more effective MR image to the third person in accordance with the progress of the MR game. The MR game device 3 may provide such an MR image that the spectator 20 can better enjoy the progress of the game, Now, the MR game system 1 of the present embodiment will be described in comparison with a conventional MR game system in reference to FIG. 5. FIG. 5 is a drawing representing example spectator-viewing-intended images. Portions (a) and (b) of FIG. 5 are drawings representing conventional spectator-viewing-intended images, whereas (c) of FIG. 5 is a drawing representing a spectator-viewing-intended image in accordance with the present embodiment.

Some conventional MR game systems display, on a display device 206 used for viewing by a spectator, only an image generated for viewing by a competitor as shown in (a) of FIG. 5. In this implementation, the spectator may recognize the virtual objects 11A and 11B. However, the spectator, not being the competitor himself/herself, would not understand the situation of the competitor who is outside the image (in (a) of FIG. 5, the competitor 10B). The spectator therefore would be forced to guess approximately half the progress of the MR game by observing changes in the image viewed by the competitor 10B. The spectator would have trouble having an overview of the progress of the MR game in such a conventional MR game system.

If an objective viewpoint imaging camera is used in the MR game system of Patent Literature 1 to display a spectator-viewing-intended image on a display device 106 provided for viewing by the spectator, the spectator can recognize the situation of both the competitors 10A and 10B as shown in (b) of FIG. 5. However, in this implementation of the MR game system, the display device 106 displays MR game fighting played in a realistic world. The only virtual components of the displayed image are the virtual objects 11A and 11B. This displayed image is no adequate representation of the world view of the MR game.

In contrast, as shown in (c) of FIG. 5, the MR game system 1 of the present embodiment enables an arbitrary virtual background, the virtual objects 11A and 11B, and the competitors 10A and 10B, all altering with the progress of the game, to be arranged in arbitrary locations. The MR game system 1 can thereby generate an image of these background and objects as viewed from an arbitrary viewpoint and display the image on the display device 2 for viewing by the spectator. The MR game system 1 can therefore display the progress of the MR game as an MR image (e.g., an MR image that resembles a fighting scene in television animation) through which the spectator 20 would adequately enjoy the world view of the MR game.

In addition, the MR game system of Patent Literature 1 requires use of an objective viewpoint imaging camera to provide an image to the spectator. In contrast, the MR game device 3 of the present embodiment generates a spectator-viewing-intended image from a spectator viewpoint image as described above. Therefore, the MR game device 3 is capable of generating a spectator-viewing-intended image without using an objective viewpoint imaging camera. In other words, the MR game device 3 is capable of presenting a more effective MR image to the spectator 20 using the minimum necessary equipment.

Variation Examples

The HMDs 4A and 4B may be of a video see-through type. In such a case, the MR game system 1 does not need to include the competitor-viewing-intended image synthesis unit 342. In other words, the competitors 10A and 10B can view the same image as the spectator-viewing-intended image without having to integrate the image of the competitor 10A or 10B into a composite image containing the images of the virtual objects 11A and 11B.

The display devices on the HMDs 4A and 4B may display the spectator-viewing-intended image displayed on the display device 2 if the HMDs 4A and 4B have sufficient resources.

The viewpoint of the spectator 20 may be switched in accordance with the progress of the MR game. Specifically, as described above, the field viewpoint information contained in the spectator viewpoint information may be automatically altered in accordance with the progress of the MR game (the results of determination made on the situation of fighting by the game state control unit 33). Alternatively, the field viewpoint information may, for example, be manually altered in response to an instruction from the spectator 20. In this implementation, the viewpoint indicated in the field viewpoint information is selectable by the spectator 20, and the selection is achieved by a remote controller or like manual operation unit (not shown) obtaining a viewpoint selected by the spectator 20.

Embodiment 2

The following will describe another embodiment of the present invention in reference to FIGS. 6 to 8. For convenience of description, members of the present embodiment that have the same function as members of the previous embodiment are indicated by the same reference numerals, and description thereof is omitted.

Overview of MR Game System 1a

Referring to FIG. 6, an MR game system 1a (display system) will first be described. FIG. 6 is a drawing illustrating an example of the MR game system 1a. The MR game system 1a includes an MR game device 3a (image generating device) in place of the MR game device 3. As a result, the spectator-viewing-intended image displayed on the display device 2 contains images of avatars 12A and 12B of the competitors 10A and 10B respectively, in place of images of the competitors 10A and 10B. In this respect, is the MR game system 1a different from the MR game system 1 of Embodiment 1.

Details of MR Game Device 3a

Next, the MR game device 3a will be described in detail in reference to FIG. 7. FIG. 7 is a diagram of an example configuration of the MR game device 3a in accordance with the present embodiment. Referring to FIG. 7, the MR game device 3a includes a control unit 30a and a memory unit 40. The control unit 30a generally controls the MR game device 3a and includes a card information obtaining unit 31, a captured image data obtaining unit 32, a game state control unit 33, a competitor-viewing-intended image generating unit 34, and a spectator-viewing-intended image generating unit 35a.

Similarly to the spectator-viewing-intended image generating unit 35 of Embodiment 1, the spectator-viewing-intended image generating unit 35a is for generating a spectator-viewing-intended image for output to the display device 2. The spectator-viewing-intended image generating unit 35a includes a position determining unit 351, a spectator-viewing-intended virtual object image generating unit 352, a spectator-viewing-intended avatar image generating unit 354, and a spectator-viewing-intended image synthesis unit 353a (image generating unit).

The position determining unit 351 determines the aforementioned first and second display positions similarly to Embodiment 1. The second display positions as they are determined in the present embodiment are locations where images of the avatars 12A and 12B are displayed.

The spectator-viewing-intended avatar image generating unit 354, obtaining the arrangement position information representing the first and second display positions determined by the position determining unit 351, retrieves 3D models of the avatars 12A and 12B respectively representing the competitors 10A and 10B from the memory unit 40. The spectator-viewing-intended avatar image generating unit 354 then generates images of the avatars 12A and 12B to be contained in a spectator-viewing-intended image on the basis of the spectator viewpoint information. Specifically, the spectator-viewing-intended avatar image generating unit 354 generates images of the avatars 12A and 12B by adjusting the sizes of the 3D models of the avatars 12A and 12B to the sizes indicated by the information indicating the sizes of the competitors 10A and 10B that is contained in the spectator viewpoint information. The spectator-viewing-intended avatar image generating unit 354 transmits information representing the generated images of the avatars 12A and 12B to the spectator-viewing-intended image synthesis unit 353a.

The memory unit 40 contains a plurality of 3D models of the avatars. The spectator-viewing-intended avatar image generating unit 354 retrieves the 3D models in a prescribed sequence. The spectator-viewing-intended avatar image generating unit 354 may recognize, for example, the number of the sets of second location information contained in the arrangement position information, sequentially retrieve the same number of 3D models of avatars as the number of the sets of second location information, and associate the retrieved 3D models of avatars with locations indicated by the sets of second location information.

Alternatively, each competitor may choose one of avatars before the start of the MR game, so that the spectator-viewing-intended avatar image generating unit 354 can retrieve 3D models of avatars on the basis of these choices.

The spectator viewpoint information of the present embodiment may contain information representing, in addition to the size of each avatar, the orientation and posture of the avatar in the form of parameters determined based on the results of determination made by the game state control unit 33 (parameters that alter with the progress of the MR game). When this is the case, the spectator-viewing-intended avatar image generating unit 354 generates avatar images that have the sizes, orientations, and postures indicated by the spectator viewpoint information.

The spectator-viewing-intended image synthesis unit 353a generates a spectator-viewing-intended image on the basis of the spectator viewpoint information generated by the game state control unit 33. Specifically, the spectator-viewing-intended image synthesis unit 353a integrates the images of the virtual objects 11A and 11B generated by the spectator-viewing-intended virtual object image generating unit 352 at the first display positions determined by the position determining unit 351 similarly to Embodiment 1.

The spectator-viewing-intended image synthesis unit 353a also integrates the images of the avatars 12A and 12B generated by the spectator-viewing-intended avatar image generating unit 354, instead of the images of the competitors 10A and 10B, into the image representing the field as viewed from the viewpoint of the spectator 20 at the second display positions determined by the position determining unit 351.

Specifically, the spectator-viewing-intended image synthesis unit 353a arranges the images of the virtual objects 11A and 11B and the images of the avatars 12A and 12B at the first and second display positions determined by the position determining unit 351, to generate a spectator-viewing-intended image of a virtual space containing these images as viewed from the virtual space viewpoint of the spectator 20. The spectator-viewing-intended image synthesis unit 353a then transmits the generated spectator-viewing-intended image as spectator-viewing-intended image data to the display device 2, so that the spectator-viewing-intended image can be displayed on the display device 2.

Since the spectator-viewing-intended image synthesis unit 353a does not integrate the images of the competitors 10A and 10B, the spectator-viewing-intended image synthesis unit 353a does not need to analyze the captured image data obtained by the captured image data obtaining unit 32 from the HMDs 4A and 4B similarly to Embodiment 1.

Processing in MR Game Device 3a

Next, a process performed by the MR game device 3a (method of controlling the MR game device 3a) will be described in detail in reference to FIG. 8. The description will focus on the generation of a spectator-viewing-intended image displayed on the display device 2. FIG. 8 is a flow chart depicting an example process carried out by the MR game device 3a. Description will be omitted about the same steps as the corresponding steps in the process shown in FIG. 4 that is carried out by the MR game device 3 in Embodiment 1 (namely, S1, S2, S4, and S6).

After S2, in the MR game device 3a, the position determining unit 351 determines first display positions where images of the virtual objects 11A and 11B will be displayed and second display positions where images of the avatars 12A and 12B of the respective competitors 10A and 10B will be displayed (S11). The position determining unit 351 determines the first and second display positions in the same manner similarly to Embodiment 1. The resultant images displayed at the second display positions respectively contain images of the avatars 12A and 12B, not images of the competitors 10A and 10B.

After S4, the spectator-viewing-intended avatar image generating unit 354 generates images of the avatars 12A and 12B on the basis of the spectator viewpoint information (S12). S4 and S12 may be performed in the reverse sequence or simultaneously.

After S12, the spectator-viewing-intended image synthesis unit 353a superimposes the images of the virtual objects 11A and 11B generated by the spectator-viewing-intended virtual object image generating unit 352 at the first display positions determined by the position determining unit 351 and also superimposes the images of the avatars 12A and 12B generated by the spectator-viewing-intended avatar image generating unit 354 at the second display positions determined by the position determining unit 351. These superimpositions generate a spectator-viewing-intended image (S13: image generating step).

The display device 2 then displays the spectator-viewing-intended image so that the spectator 20 can view an MR image that contains the images of the virtual objects 11A and 11B and the images of the avatars 12A and 12B on a virtual space background and that alters with the progress of the MR game.

Major Effects of Embodiment 2

The game device 3a generates, in accordance with the progress of the MR game, a spectator-viewing-intended image of a virtual space containing images of the virtual objects 11A and 11B and images of the avatars 12A and 12B representing the respective competitors 10A and 10B as viewed from a virtual space viewpoint of the spectator 20. In other words, the MR game device 3a displays images of the avatars 12A and 12B, in place of images of the competitors 10A and 10B, on the display device 2. In this implementation, the MR game device 3a may present a more effective MR image to the third person in accordance with the progress of the MR game as may the MR game device 3.

The display device 2 displays images of the avatars 12A and 12B, not images of the competitors 10A and 10B. Therefore, if the HMDs 4A and 4B do not need to display images of the competitors 10A and 10B, the HMDs 4A and 4B do not need to include an image capturing device.

When this is the case, the second display positions where images of the avatars 12A and 12B are displayed are determined based only on the results of determination made by the game state control unit 33, without using information representing the viewpoints of the competitors 10A and 10B. The competitors 10A and 10B may be arranged respectively in any locations within the ranges RA and RB shown in FIG. 3. If the competitors 10A and 10B are arranged in this manner, the second display positions may, also in Embodiment 1, be determined based only on the results of the determination.

If the HMDs 4A and 4B do not include an image capturing device, the competitor-viewing-intended image does not contain images of the competitors 10A and 10B. If the competitor-viewing-intended image is to contain an image of the competitor 10A (i.e., opponent), the competitor-viewing-intended image synthesis unit 342 may, for example, integrate an image of the avatar 12A representing the competitor 10A that is generated by the spectator-viewing-intended avatar image generating unit 354 into the competitor-viewing-intended image displayed by the HMD 4B. Likewise, the competitor-viewing-intended image synthesis unit 342 may integrate an image of the avatar 12B representing the competitor 10B into the competitor-viewing-intended image displayed by the HMD 4A. The opponent avatar image in a competitor-viewing-intended image may be arranged, for example, in any prescribed location that is opposite the competitor 10A or 10B across the card stand 6. The HMDs 4A and 4B may be of a video see-through type in the present embodiment. In such a case, the competitor-viewing-intended images displayed by the HMDs 4A and 4B may include a real-world image of the competitor 10A or 10B as viewed through the HMDs 4A and 4B, not an image of the avatar 12A or 12B representing the competitor 10A or 10B.

Furthermore, because the competitors 10A and 10B do not need to be imaged by an image capturing device, the competitors 10A and 10B do not need to be positioned face to face. The competitors 10A and 10B can therefore take part in the MR game from various locations.

Embodiment 3

Figure 9:
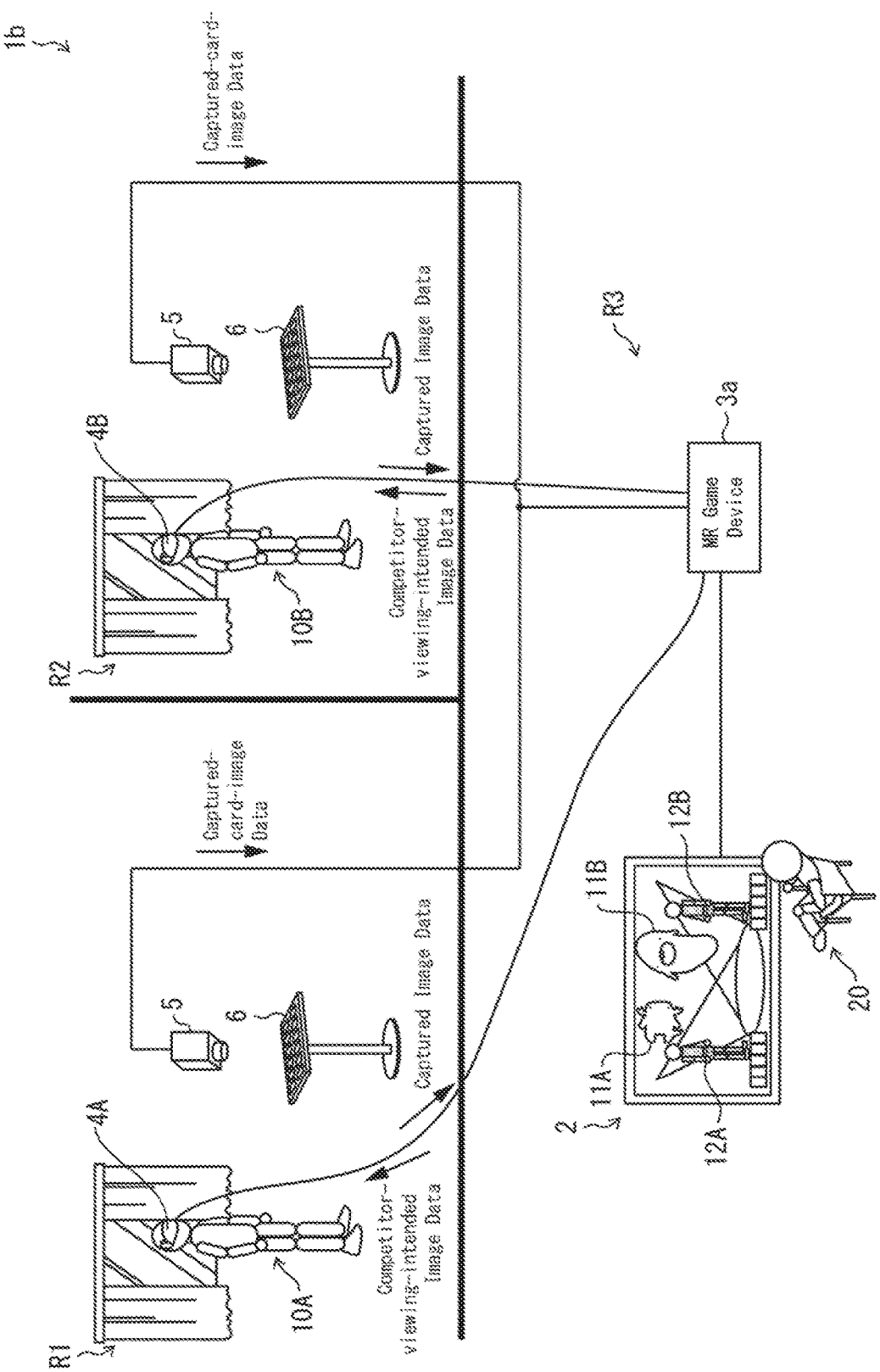

The following will describe another embodiment of the present invention in reference to FIG. 9. For convenience of description, members of the present embodiment that have the same function as members of the previous embodiments are indicated by the same reference numerals, and description thereof is omitted.

Referring to FIG. 9, an MR game system 1b (display system) will be described. FIG. 9 is a drawing illustrating an example of the MR game system 1b. In the MR game system 1b, the MR game device 3a shown in FIG. 7 generates competitor-viewing-intended images and a spectator-viewing-intended image similarly to Embodiment 2. In other words, the competitor-viewing-intended images displayed by the HMDs 4A and 4B for viewing by the competitors 10A and 10B and the spectator-viewing-intended image displayed on the display device 2 for viewing by the spectator 20 are the same as the competitor-viewing-intended images and the spectator-viewing-intended image of Embodiment 2 respectively.

In Embodiment 2, the competitors 10A and 10B are positioned face to face across the card stand 6 to play the MR game fighting. In other words, at least the competitors 10A and 10B are present in the same space for fighting in Embodiment 2.

In contrast, the MR game system 1b provides competitor-dedicated rooms R1 and R2 and a spectator-dedicated room R3.

The competitor-dedicated rooms R1 and R2 are for use by the competitors 10A and 10B playing the MR game. Each competitor-dedicated room R1 and R2 is provided with a card imaging camera 5 and a card stand 6. To take part in the fighting in the MR game, the competitor 10A enters the competitor-dedicated room R1, and the competitor 10B enters the competitor-dedicated room R2, as an example.

In the present embodiment, since the competitors 10A and 10B participate in the fighting from different rooms, no cards of the opponent are placed on the card stands 6 as in Embodiment 1. As such, the card stands 6 only need to provide thereon a sufficient space for the cards of either one of the competitors 10A and 10B.

The spectator-dedicated room R3, physically separated from the competitor-dedicated rooms R1 and R2, is fix use by the spectator 20 viewing the progress of the MR game played by the competitors 10A and 10B. The spectator-dedicated room R3 includes a display device 2 and an MR game device 3a.

In the present embodiment, the competitor 10A wearing the HMD 4A and the competitor 10B wearing the HMD 4B are in the respective competitor-dedicated rooms R1 and R2, which are physically separated. Therefore, the competitor 10B is not imaged by the HMD 4A, and the competitor 10A is not imaged by the HMD 4B. Therefore, if the competitor-dedicated room R1 is not provided with a room image capturing device for imaging the inside of the competitor-dedicated room R1 (in particular, the competitor 10A), and the competitor-dedicated room R2 is not provided with a room image capturing device for imaging the inside of the competitor-dedicated room R2 (in particular, the competitor 10B), neither the spectator-viewing-intended image displayed on the display device 2 nor the competitor-viewing-intended images displayed by the HMDs 4A and 4B contains images of the competitors 10A and 10B.

The MR game device 3a in accordance with Embodiment 2 is the MR game device in the present embodiment. Specifically, in the present embodiment, the spectator-viewing-intended image synthesis unit 353a generates a spectator-viewing-intended image containing the images of the virtual objects 11A and 11B generated by the spectator-viewing-intended virtual object image generating unit 352 and the images of the avatars 12A and 12B generated by the spectator-viewing-intended avatar image generating unit 354, for display on the display device 2. According to this implementation, the same image as the spectator-viewing-intended image generated in accordance with the progress of the MR game in Embodiment 2 may be presented for viewing by the spectator 20 in the present embodiment. In addition, such a spectator-viewing-intended image may be generated without having to providing each room with a room image capturing device.

The competitor-viewing-intended image synthesis unit 342 integrates images of the virtual objects 11A and 11B into the captured image data obtained from the HMDs 4A and 4B to generate competitor-viewing-intended images similarly to Embodiment 1. It should be noted that the competitor-viewing-intended images contain no image of the opponent. To generate competitor-viewing-intended images containing an image of the opponent, the competitor-viewing-intended image synthesis unit 342 may integrate an image of the avatar 12A representing the competitor 10A into the spectator-viewing-intended image displayed by the HMD 4B and integrate an image of the avatar 12B representing the competitor 10B into the spectator-viewing-intended image displayed by the HMD 4A, as described in Embodiment 2. This implementation may give the competitors 10A and 10B, who are in different locations, such a realistic feel that they are fighting face to face.

Variation Examples

The MR game device may be the MR game device 3 of Embodiment 1. In such a case, to include an image of the competitor 10A or 10B in a spectator-viewing-intended image, the competitor-dedicated rooms R1 and R2 may each be provided with, for example, the above-described room image capturing device for particularly imaging the competitor 10A or 10B.

In such an implementation, the captured image data obtaining unit 32 obtains the captured image data generated through imaging by the room image capturing device. The spectator-viewing-intended image synthesis unit 353 extracts images of the competitors 10A and 10B from the captured image data. The spectator-viewing-intended image synthesis unit 353 then generates a spectator-viewing-intended image containing images of the virtual objects 11A and 11B and the extracted images of the competitors 10A and 10B, for display on the display device 2. In this implementation, the same image as the spectator-viewing-intended image in Embodiment 1 may be presented for viewing by the spectator 20. Meanwhile, to include an image of the opponent in a competitor-viewing-intended image, the competitor-viewing-intended image synthesis unit 342 may extract an image of the competitor 10A from the captured image data obtained from the room image capturing device in the competitor-dedicated room R1 to include the extracted image in a competitor-viewing-intended image for the HMD 4B. Likewise, the competitor-viewing-intended image synthesis unit 342 may extract an image of the competitor 10B from the captured image data obtained from the room image capturing device in the competitor-dedicated room R2 to include the extracted image in a competitor-viewing-intended image for the HMD 4A.

FIG. 9 shows the card imaging camera 5, the HMDs 4A and 4B, and the MR game device 3 being connected via cables. Alternatively, each device may be connected with the other devices wirelessly, not via cables (not via wired links), as long as the devices can exchange data with each other, as in the case in Embodiment 1. It is preferable that the devices be connected wirelessly especially when the competitor-dedicated rooms R1 and R2 and the spectator-dedicated room R3 are located in different buildings, not in the same building (e.g., when these rooms are remotely located).

The MR game device 3 is not necessarily located in the spectator-dedicated room R3. Alternatively, the MR game device 3 may be located, for example, in a room other than the competitor-dedicated rooms R1 and R2 and the spectator-dedicated room R3 and may be located in the competitor-dedicated room R1 or R2.

There may be provided three or more competitor-dedicated rooms and/or two or more spectator-dedicated rooms. If there are three or more competitor-dedicated rooms, three or more competitors can take part in the MR game from respective dedicated fighting rooms. If there are two or more spectator-dedicated rooms, spectators can view the progress of the MR game from various locations.

The card imaging camera 5 may be replaced by a scanner or like reading unit capable of reading card information, similarly to Embodiment 1.

Major Effects of Embodiment 3

Similarly to previous examples, the MR game system 1b may generate, in accordance with the progress of the MR game, a spectator-viewing-intended image of a virtual space containing images of the virtual objects 11A and 11B and images of the avatars 12A and 12B (or images of the competitors 10A and 10B) as viewed from a virtual space viewpoint of the spectator 20. Therefore, the present embodiment may similarly to previous examples present a more effective MR image to the third person in accordance with the progress of the MR game.

If the spectator-viewing-intended image contains images of the avatars 12A and 12B, the competitors 10A and 10B may take part in the MR game from different locations (the competitor-dedicated rooms R1 and R2 in the description above) without using room image capturing devices. Additionally, the HMDs 4A and 4B do not need to include an image capturing device as described in Embodiment 2.

If the HMDs 4A and 4B do not need to include an image capturing device, the competitors 10A and 10B may not wear the HMDs 4A and 4B. When this is the case, a competitor-viewing-intended image containing the virtual objects 11A and 11B that is generated by the competitor-viewing-intended image synthesis unit 342 for display by the HMD 4A may be displayed on a wall of the competitor-dedicated room R1 faced by the competitor 10A by using a projection device such as a projector. A competitor-viewing-intended image generated for display by the HMD 4B may similarly he displayed on a wall of the competitor-dedicated room R2 faced by the competitor 10B. Furthermore, as described earlier, the competitor-viewing-intended image may contain an image of the avatar 12A or 12B representing the opposing competitor 10A or 10B (or an image of the competitor 10A or 10B if a room image capturing device is used).

Embodiment 4

The following will describe another embodiment of the present invention in reference to FIGS. 10 and 11. For convenience of description, members of the present embodiment that have the same function as members of the previous embodiments are indicated by the same reference numerals, and description thereof is omitted. An MR game system 1c (display system) in accordance with the present embodiment differs from the MR game system 1 of Embodiment 1 in that the MR game system 1c includes an MR game device 3c (image generating device) in place of the MR game device 3.

Details of MR Game Device 3c

The MR game device 3c will be described in detail in reference to FIG. 10. FIG. 10 is a diagram of an example configuration of the MR game device 3c in accordance with the present embodiment. Referring to FIG. 10, the MR game device 3c includes a control unit 30c and a memory unit 40. The control unit 30c generally controls the MR game device 3c and includes a card information obtaining unit 31, a captured image data obtaining unit 32, a game state control unit 33, a competitor-viewing-intended image generating unit 34, and a spectator-viewing-intended image generating unit 35c.

Similarly to the spectator-viewing-intended image generating unit 35 of Embodiment 1, the spectator-viewingintended image generating unit 35c is for generating spectator-viewing-intended image for output to the display device 2. The spectator-viewing-intended image generating unit 35c includes a position determining unit 351, a spectator-viewing-intended virtual object image generating unit 352, a spectator-viewing-intended avatar image generating unit 354, and a spectator-viewing-intended image synthesis unit 353c (image generating unit).

The position determining unit 351 determines the above-described first and second display positions similarly to Embodiment 1. The second display position as it is determined in the present embodiment is either a location where an image of the competitor 10A or the avatar 12A is displayed or a location where an image of the competitor 10B or the avatar 12B is displayed.

The spectator-viewing-intended avatar image generating unit 354 retrieves a 3D model of either one of the avatars 12A and 12B respectively representing the competitors 10A and 10B from the memory unit 40. The spectator-viewing-intended avatar image generating unit 354 then generates an image of either the avatar 12A or 12B to be contained in a spectator-viewing-intended image on the basis of spectator viewpoint information.

The spectator-viewing-intended image synthesis unit 353c generates a spectator-viewing-intended image on the basis of the spectator viewpoint information generated by the game state control unit 33. Specifically, the spectator-viewing-intended image synthesis unit 353 integrates the images of the virtual objects 11A and 11B generated by the spectator-viewing-intended virtual object image generating unit 352 at the first display positions determined by the position determining unit 351 similarly to Embodiment 1.

The spectator-viewing-intended image synthesis unit 353c also integrates the image of the avatar 12A or 12B generated by the spectator-viewing-intended avatar image generating unit 354 at the second display position determined by the position determining unit 351.

Regarding either the competitor 10A or 10B whose avatar image has not been generated by the spectator-viewing-intended avatar image generating unit 354, the spectator-viewing-intended image synthesis unit 353c analyzes the captured image data obtained by the captured image data obtaining unit 32 from the HMD 4A or 4B, to extract an image of that competitor 10A or 10B. The spectator-viewing-intended image synthesis unit 353 integrates, at the second display position determined by the position determining unit 351, the image of the competitor 10A or 10B extracted from the captured image data and adjusted in size in accordance with size-representing information contained in the spectator viewpoint information.

Specifically, the spectator-viewing-intended image synthesis unit 353c arranges the images of the virtual objects 11A and 11B at the first display positions determined by the position determining unit 351 and either the images of the competitor 10A and the avatar 12B or the images of the competitor 10B and the avatar 12A at the second display positions determined by the position determining unit 351, to generate a spectator-viewing-intended image of a virtual space containing these images as viewed from the virtual space viewpoint of the spectator 20. The spectator-viewing-intended image synthesis unit 353c then transmits the generated spectator-viewing-intended image as spectator-viewing-intended image data to the display device 2, so that the spectator-viewing-intended image can be displayed on the display device 2. FIG. 11 shows an example of the spectator-viewing-intended image, containing an image of the competitor 10A and an image of the avatar 12B, generated and displayed by the spectator-viewing-intended image synthesis unit 353c on the display device 2.

In this implementation, as an example, it is assumed that the competitor 10A is wearing the HMD 4A in the MR game fighting, whereas the competitor 10B is fighting looking only at the cards placed on the card stand 6 calmly and carefully without wearing the HMD 4B. In such a situation, the competitor 10A would react to the progress of the MR game, and the spectator 20 would enjoy watching the competitor 10A himself/herself in the virtual space. In contrast, for the competitor 10B does not react to the progress of the MR game, the competitor 10B would seldom move, and the spectator 20 could not enjoy watching the competitor 10B himself/herself in the virtual space.

Under the circumstances, the spectator-viewing-intended image synthesis unit 353c generates a spectator-viewing-intended image containing an image of the avatar 12B representing the competitor 10B and displays the image on the display device 2, which may create an environment in which the spectator 20 can enjoy the MR game better than just by watching the competitor 10B himself/herself. An especially enjoyable environment may be created if the avatar can change its orientation or posture in accordance with the progress of the MR game (if the spectator viewpoint information contains information representing the avatar's orientation or posture).

For which of the competitors 10A and 10B the spectator-viewing-intended avatar image generating unit 354 is to generate an avatar image is determined in the following manner as an example. For example, where it is likely that either the HMD 4A or 4B is not being worn as in the situation described above, it may be determined, upon detection of the HMD 4A or 4B being placed in a prescribed location, that the spectator-viewing-intended avatar image generating unit 354 is to generate an avatar image for either the competitor 10A or the competitor 10B, whoever is not wearing the HMD 4B. The prescribed location is preferably a location where the HMD 4A or 4B, whichever is not being worn, can image the opponent. Alternatively, it may be determined whether the spectator-viewing-intended avatar image generating unit 354 is to generate an avatar image for the competitor 10A or for the competitor 10B, by relying on an input from an operation unit (not shown) provided in the MR game device 3c.

Major Effects of Present Embodiment

The MR game device 3c generates a spectator-viewing-intended image of a virtual space containing images of the virtual objects 11A and 11B, an image of one of the competitors 10A and 10B himself/herself, and an avatar image of the other competitor as viewed from a virtual space viewpoint of the spectator 20 in accordance with the progress of the MR game, for display on the display device 2. The MR game device 3c may present a more effective MR image to the third person in accordance with the progress of the MR game as may the MR game device 3 of Embodiment 1.

Software Implementations

The control blocks of the MR game device 3, 3a, or 3c (particularly, control blocks in the control unit 30, 30a, or 30c: namely, the card information obtaining unit 31, the captured image data obtaining unit 32, the game state control unit 33, the competitor-viewing-intended virtual object image generating unit 341 and the competitor-viewing-intended image synthesis unit 342 of the competitor-viewing-intended image generating unit 34, and the position determining unit 351, the spectator-viewing-intended virtual object image generating unit 352, the spectator-viewingintended image synthesis unit 353, 353a, or 353c, and the spectator-viewing-intended avatar image generating unit 354 of the spectator-viewing-intended image generating unit 35, 35a, or 35c) may be implemented with logic circuits (hardware) fabricated, for example, in the form of an integrated circuit (IC chip) and may be implemented by software executed by a CPU (central processing unit).

In the latter case, the MR game device 3, 3a, or 3c includes among others a CPU that executes instructions from programs or software by which various functions are implemented, a ROM (read-only memory) or like storage device (referred to as a "storage medium") containing the programs and various data in a computer-readable (or CPU-readable) format, and a RAM (random access memory) into which the programs are loaded. The computer (or CPU) retrieves and executes the programs contained in the storage medium, thereby achieving the object of an aspect of the present invention. The storage medium may be a "non-transient, tangible medium" such as a tape, a disc, a card, a semiconductor memory, or programmable logic circuitry. The programs may be fed to the computer via any transmission medium (e.g., over a communications network or by broadcasting waves) that can transmit the programs. The present invention, in an aspect thereof, encompasses data signals on a carrier wave that are generated during electronic transmission of the programs.

Summation

The present invention, in aspect 1 thereof, is directed to an image generating device (MR game device 3, 3a, 3c) that generates an image, the device including an image generating unit (spectator-viewing-intended image synthesis unit 353, 353a, or 353c) configured to generate a third person viewpoint image (spectator-viewing-intended image) of a virtual space as viewed from a virtual space viewpoint of a non-user, third person (spectator 20) in accordance with progress of a prescribed story of a game in which a virtual object is generated (MR game), the virtual space containing an image of the virtual object (11A, 11B) and either an image of at least one user himself/herself (competitors 10A and 10B) of the game or an image of an avatar (12A, 12B) representing the user.

According to this arrangement, a third person viewpoint image of a virtual space is generated in accordance with the progress of a prescribed story of a game, the virtual space containing an image of a virtual object and an image of the user himself/herself or his/her avatar. A more effective image reflecting the progress may therefore be presented to a third person, irrespective of the relative positions of users and the environment around the user.

In aspect 2 of the present invention, the image generating device of aspect 1 may be arranged such that the image generating unit generates the third person viewpoint image based on third person viewpoint information (spectator viewpoint information) related to the progress of the prescribed story and to the virtual space viewpoint of the third person.

According to this arrangement, the third person viewpoint image is generated based on third person viewpoint information. Therefore, the third person viewpoint image may be generated without using an image capturing device that captures an image of a space containing the user to generate a spectator-viewing-intended image, which differs from a conventional example.

In aspect 3 of the present invention, the image generating device of aspect 2 may be arranged to further include a position determining unit (351) configured to determine based on the third person viewpoint information a first display position where the image of the virtual object is displayed and a second display position where either the image of the user himself/herself or the image of the avatar is displayed, wherein the image generating unit arranges the image of the virtual object at the first display position determined by the position determining unit and either the image of the user himself/herself or the image of the avatar at the second display position determined by the position determining unit, to generate the third person viewpoint image.

According to this arrangement, the image of the virtual object and either the image of the user himself/herself or the image of the avatar may be arranged respectively at the first and second display positions determined based on the third person viewpoint information, to generate the third person viewpoint image.

In aspect 4 of the present invention, the image generating device of aspect 2 or 3 may be arranged such that the third person viewpoint information includes at least any of: field information representing a field in which the prescribed story progresses and the virtual object can be arranged; field viewpoint information representing a viewpoint from which the field is viewed; and object alteration information representing an alteration in an object of interest that occurs in the field with the progress of the prescribed story.

According to this arrangement, the third person viewpoint image may be generated from various viewpoints in accordance with the progress of the prescribed story.

In aspect 5 of the present invention, the image generating device of any one of aspects 1 to 4 may be arranged to further include a virtual object image generating unit (spectator-viewing-intended virtual object image generating unit 352) configured to generate the image of the virtual object, wherein: the at least one user includes a plurality of users, at least one of the users wearing an image capturing device (HMDs 4A and 4B); and the image generating unit (spectator-viewing-intended image synthesis unit 353, 353c) synthesizes the third person viewpoint image from an image of another one of the users captured by the image capturing device and an image containing the image of the virtual object generated by the virtual object image generating unit.

According to this arrangement, the third person viewpoint image may be synthesized from an image of a user and an image containing the image of the virtual object. Therefore, an image that contains the user himself/herself may be presented to the third person. The spectator may hence enjoy the progress while watching the facial expressions of a user.

In aspect 6 of the present invention, the image generating device of any one of aspects 1 to 4 may be arranged to further include a virtual object image generating unit (spectator-viewing-intended virtual object image generating unit 352) configured to generate the image of the virtual object, wherein the image generating unit (spectator-viewing-intended image synthesis unit 353a, 353c) synthesizes the third person viewpoint image from the image of the avatar and an image containing the image of the virtual object generated by the virtual object image generating unit.

According to this arrangement, the third person viewpoint image may be synthesized from the image of the avatar representing a user and an image containing the image of the virtual object. Therefore, the third person viewpoint image may be generated without using an image capturing device that captures an image of the user.

The present invention, in aspect 7 thereof, is directed to a method of controlling an image generating device (3, 3a, 3c) that generates an image, the method including the image generating step (S5, S13) of generating a third person viewpoint image of a virtual space as viewed from a virtual space viewpoint of a non-user, third person in accordance with progress of a prescribed story of a game in which a virtual object is generated, the virtual space containing an image of the virtual object and either an image of at least one user himself/herself of the game or an image of an avatar representing the user.

According to this arrangement, a more effective image reflecting the progress of a prescribed story of a game may be provided to a third person similarly to aspect 1.

The present invention, in aspect 8 thereof, is directed to a display system (MR game system 1, 1a, 1b, 1c) including: the image generating device according to any one of aspects 1 to 6; and a display device (display device 2) configured to display the third person viewpoint image generated by the image generating device.

According to this arrangement, a more effective image reflecting the progress of a prescribed story of a game may be provided to a third person similarly to aspect 1.

In each aspect of the present invention, the image generating device may be implemented on a computer. In such cases, the scope of the present invention encompasses: an image generation control program that causes a computer to operate as components (software elements) of the image generating device such that the image generating device is implemented by the computer; and a computer-readable storage medium containing the image generation control program.

Additional Remarks

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technological feature may be created by combining different technological means disclosed in the embodiments.

CROSS-REFERENCE TO RELATED APPLICATIONS

The present application claims the benefit of Japanese Patent Application, Tokugan, No. 2015-207307 filed Oct. 21, 2015, the entire contents of which are hereby incorporated herein by reference.

REFERENCE SIGNS LIST 1,1a, 1b, 1c MR game system (display system)
2 Display device (display device)
3, 3a, 3c MR game device (image generating device)
4A, 4B HMD (image capturing device)
10A, 10B Competitor (user)
11A, 11B Virtual object
12A, 12B Avatar
20 Spectator (third person)
351 Position determining unit
352 Spectator-viewing-intended virtual object image generating unit (virtual object image generating unit)
353, 353a, 353c Spectator-viewing-intended image synthesis unit(image generating unit)

The invention claimed is:

1. A display system comprising:
an image generating device that generates an image, the image generating device including:
a processor; and
a memory associated with the processor, wherein the processor functions as:
a position determining unit configured to determine, based on third person viewpoint information, a first display position where an image of a virtual object is displayed and a second display position where either an image of at least one user himself/herself of a game in which the virtual object is generated or an image of an avatar representing the user is displayed, the third person viewpoint information being related to (1) progress of a prescribed story of the game and to (2) a virtual space viewpoint of a non-user, third person in a virtual space containing the image of the virtual object and either the image of the user himself/herself or the image of the avatar; and
an image generating unit configured to generate a third person viewpoint image of the virtual space as viewed from the virtual space viewpoint of the third person in accordance with the progress of the prescribed story by arranging the image of the virtual object at the first display position determined by the position determining unit and either the image of the user himself/herself or the image of the avatar at the second display position determined by the position determining unit,
said display system further comprising:
a display device configured to display the third person viewpoint image generated by the image generating device,
the display device being different from a Head Mount Display worn by the user and serving as an image capturing device, and
the display device being provided in a spectator-dedicated room, which is physically separated from a room for use by the user playing the game and is used by the third person viewing progress of the game.

2. The display system according to claim 1, wherein the third person viewpoint information comprises at least any of: field information representing a field in which the prescribed story progresses and the virtual object can be arranged; field viewpoint information representing a viewpoint from which the field is viewed; and object alteration information representing an alteration in an object of interest that occurs in the field with the progress of the prescribed story.

3. The display system according to claim 1, wherein the processor further functions as a virtual object image generating unit configured to generate the image of the virtual object;
the at least one user comprises a plurality of users, at least one of the users wearing the image capturing device; and
the image generating unit synthesizes the third person viewpoint image from an image of another one of the users captured by the image capturing device and an image containing the image of the virtual object generated by the virtual object image generating unit.

4. The display system according to claim 1, wherein the processor further functions as a virtual object image generating unit configured to generate the image of the virtual object, wherein the image generating unit synthesizes the third person viewpoint image from the image of the avatar and an image containing the image of the virtual object generated by the virtual object image generating unit.

5. A non-transitory computer-readable storage medium containing an image generation control program that causes a computer to operate as the image generating device of the display system according to claim 1, the program causing the computer to operate as the position determining unit and the image generating unit.

6. A method of controlling a display system including: an image generating device that generates an image; and a display device, said method comprising the steps of:
(a) determining, based on third person viewpoint information, a first display position where an image of a virtual object is displayed and a second display position where either an image of at least one user himself/herself of a game in which the virtual object is generated or an image of an avatar representing the user is displayed, the third person viewpoint information being related to (1) progress of a prescribed story of the game and to (2) a virtual space viewpoint of a non-user, third person in a virtual space containing the image of the virtual object and either the image of the user himself/herself or the image of the avatar; and
(b) generating a third person viewpoint image of the virtual space as viewed from the virtual space viewpoint of the third person in accordance with the progress of the prescribed story by arranging the image of the virtual object at the first display position determined in the step (a) and either the image of the user himself/herself or an image of the avatar at the second display position determined in the step (a), the display device being configured to display the third person viewpoint image generated in the step (b) and being different from a Head Mount Display worn by the user and serving as an image capturing device, and the display device being provided in a spectator-dedicated room, which is physically separated from a room for use by the user playing the game and is used by the third person viewing progress of the game.

7. A display system comprising:
an image generating device that generates an image, the image generating device including:
a position determining circuit configured to determine, based on third person viewpoint information, a first display position where an image of a virtual object is displayed and a second display position where either an image of at least one user himself/herself of a game in which the virtual object is generated or an image of an avatar representing the user is displayed, the third person viewpoint information being related to (1) progress of a prescribed story of the game and to (2) a virtual space viewpoint of a non-user, third person in a virtual space containing the image of the virtual object and either the image of the user himself/herself or the image of the avatar; and an image generating circuit configured to generate a third person viewpoint image of the virtual space as viewed from the virtual space viewpoint of the third person in accordance with the progress of the prescribed story by arranging the image of the virtual object at the first display position determined by the position determining circuit and either the image of the user himself/herself or the image of the avatar at the second display position determined by the position determining circuit; and a display device configured to display the third person viewpoint image generated by the image generating device, the display device being different from a Head Mount Display worn by the user and serving as an image capturing device, and the display device being provided in a spectator-dedicated room, which is physically separated from a room for use by the user playing the game and is used by the third person viewing progress of the game.

8. The display system according to claim 7, wherein the third person viewpoint information comprises at least any of: field information representing a field in which the prescribed story progresses and the virtual object can be arranged; field viewpoint information representing a viewpoint from which the field is viewed; and object alteration information representing an alteration in an object of interest that occurs in the field with the progress of the prescribed story.

9. The display system according to claim 7, further comprising a virtual object image generating circuit configured to generate the image of the virtual object,
wherein:
the at least one user comprises a plurality of users, at least one of the users wearing the image capturing device; and
the image generating circuit synthesizes the third person viewpoint image from an image of another one of the users captured by the image capturing device and an image containing the image of the virtual object generated by the virtual object image generating circuit.

10. The display system according to claim 7, further comprising a virtual object image generating circuit configured to generate the image of the virtual object, wherein the image generating circuit synthesizes the third person viewpoint image from the image of the avatar and an image containing the image of the virtual object generated by the virtual object image generating circuit.

* * * * *